(12) United States Patent
Chen et al.

(10) Patent No.: US 11,493,605 B2
(45) Date of Patent: Nov. 8, 2022

(54) DEPTH INFORMATION CAMERA MODULE AND BASE ASSEMBLY, PROJECTION ASSEMBLY, ELECTRONIC DEVICE AND MANUFACTURING METHOD THEREOF

(71) Applicant: NINGBO SUNNY OPOTECH CO., LTD., Yuyao (CN)

(72) Inventors: Feifan Chen, Yuyao (CN); Zhongwei Wang, Yuyao (CN); Qi Rong, Yuyao (CN); Junjie Zeng, Yuyao (CN); Hangang Wei, Yuyao (CN); Beibei Dai, Yuyao (CN); Minjie Pan, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 766 days.

(21) Appl. No.: 16/429,309

(22) Filed: Jun. 3, 2019

(65) Prior Publication Data

US 2020/0003870 A1 Jan. 2, 2020

(30) Foreign Application Priority Data

Jun. 28, 2018 (CN) .......................... 201810685315.2
Jun. 28, 2018 (CN) .......................... 201821007441.4

(51) Int. Cl.
*H04N 5/44* (2011.01)
*G01S 7/481* (2006.01)
(Continued)

(52) U.S. Cl.
CPC ............ *G01S 7/4813* (2013.01); *G01S 17/10* (2013.01); *G01S 17/32* (2013.01)

(58) Field of Classification Search
CPC ...... G01S 7/4813; G01S 17/10; G01S 17/894; H04N 5/2254; H04N 5/2256
See application file for complete search history.

(56) References Cited

U.S. PATENT DOCUMENTS

| 11,146,713 B2* | 10/2021 | Lu ....................... G02B 27/0025 |
| 2009/0129412 A1* | 5/2009 | Kim ...................... H05K 3/3494 |
| | | 372/6 |

(Continued)

FOREIGN PATENT DOCUMENTS

| CN | 105473393 A | 4/2016 |
| CN | 205430409 U | 8/2016 |

(Continued)

OTHER PUBLICATIONS

First Search Report in a corresponding Chinese Application No. 2018106853877; 3 pgs.

*Primary Examiner* — Munear T Akki
(74) *Attorney, Agent, or Firm* — Hauptman Ham, LLP

(57) ABSTRACT

Provided are a depth information camera module and a base assembly, a projection assembly, an electronic device and a manufacturing method thereof. The depth information camera module includes: a projection assembly to project a laser to a to-be-detected object; a receiving assembly, including a photosensitive element for receiving the laser reflected from the to-be-detected object; and a base assembly, the base assembly including a circuit board and a base body, the base body being supported by the circuit board, where the photosensitive element is electrically connected to the circuit board, the projection assembly circuit board is supported on a top side of the base body such that the circuit board and the projection assembly circuit board are respectively at different heights of the base assembly. Here, the projection assembly has an integral structure to facilitate assembly of the projection assembly.

19 Claims, 17 Drawing Sheets

(51) Int. Cl.
    *G01S 17/10*    (2020.01)
    *G01S 17/32*    (2020.01)

(56)         References Cited

U.S. PATENT DOCUMENTS

2012/0105594 A1     5/2012   You et al.
2015/0160343 A1*    6/2015   Zweigle .................. G01S 17/36
                                                          356/5.04
2015/0163474 A1     6/2015   You et al.
2015/0229912 A1*    8/2015   Masalkar ............. H04N 13/254
                                                          348/46
2016/0025855 A1     1/2016   Camarri et al.
2016/0050347 A1*    2/2016   Liu ........................ G06V 40/20
                                                          348/46
2017/0155807 A1*    6/2017   Zhang ............... H01L 27/14636
2017/0302829 A1*   10/2017   Mleczko .............. H04N 5/2254
2017/0356982 A1    12/2017   Buettgen et al.
2018/0054610 A1*    2/2018   Shpunt ................. H04N 13/296
2019/0281265 A1*    9/2019   Zhang ................. H01S 5/0235
2020/0217931 A1*    7/2020   Lawrenson ............. G01S 7/484
2021/0099618 A1*    4/2021   O ........................ H04N 5/2256

FOREIGN PATENT DOCUMENTS

CN          205792878 U      12/2016
CN          206161862 U       5/2017
CN          106817794 A       6/2017
CN          206674061 U      11/2017
CN          206725922 U      12/2017
CN          206977547 U       2/2018
CN          107783353 A       3/2018
JP         2004064554 A       2/2004

\* cited by examiner

DEPTH INFORMATION CAMERA MODULE AND BASE ASSEMBLY, PROJECTION ASSEMBLY, ELECTRONIC DEVICE AND MANUFACTURING METHOD THEREOF

CROSS-REFERENCE TO RELATED APPLICATIONS

This application claims priorities to Chinese Applications No. 201810685315.2 and 201821007441.4, filed on Jun. 28, 2018, the disclosures of which are hereby incorporated by reference in their entireties.

TECHNICAL FIELD

The present disclosure relates to the field of depth information camera module, in particular to a TOF depth information camera module and a base assembly, a projection assembly, an electronic device and a manufacturing method thereof.

BACKGROUND

In recent years, as the biometric technology (e.g., facial recognition technology, iris recognition technology, fingerprint recognition, etc.) gradually develops, it has been applied to various types of mobile terminals (e.g., smart phones, tablets, etc.) to implement various types of application development based on biometrics, which commonly includes smart unlocking, mobile payment, or the like. In the facial recognition technology, a depth information camera module based on Time of Flight (TOF) is one of the most popular products.

The existing TOF depth information camera module generally includes a projection assembly, a receiving assembly and a circuit board, where the projection assembly and the receiving assembly are directly mounted and electrically connected to the circuit board, respectively. In operation, the projection assembly emits a light wave having a specific wavelength band, and the receiving assembly receives the light wave reflected by the to-be-detected object to solve depth information of the to-be-detected object based on a time difference or a phase difference between the emitted light wave and the received light wave.

However, as the various mobile terminals continue to develop to become miniaturized and thin, assembly space reserved for the TOF depth information camera module may be constantly reduced. It has become increasingly difficult for the manufacturing method and structural size of the existing TOF depth information camera module to meet the requirements on sizes and performances of the mobile terminals.

SUMMARY

The main objective of the present disclosure is to provide a depth information camera module, a base assembly, a projection assembly, an electronic device and a manufacturing method thereof. The depth information camera module adjusts the installation layout of the projection assembly and the receiving assembly through the base assembly to improve the space utilization of the TOF depth information camera module.

Another objective of the present disclosure is to provide a depth information camera module, a base assembly, a projection assembly, an electronic device and a manufacturing method thereof. The relative positional relationship between the receiving assembly and the projection assembly may be adjusted by the base assembly. Preferably, in an embodiment of the present disclosure, the mounting height of the projection assembly relative to the circuit board may be raised by the base assembly such that the height difference between top surfaces of the receiving assembly and the projection assembly is reduced or the top surfaces of the receiving assembly and the projection assembly are flush.

Another objective of the present disclosure is to provide a depth information camera module, a base assembly, a projection assembly, an electronic device and a manufacturing method thereof. In an embodiment of the present disclosure, the base assembly includes a base body integrally molded on the circuit board and covering at least one electronic component disposed on the circuit board, where a portion of the at least one electronic component is located below the projection assembly. In this way, the overall space utilization of the TOF depth information camera module is improved, in particular the space utilization in the height direction is improved and the size of the TOF depth information camera module in the horizontal direction is reduced.

Another objective of the present disclosure is to provide a depth information camera module, a base assembly, a projection assembly, an electronic device and a manufacturing method thereof. In an embodiment of the present disclosure, the base body is molded on the circuit board and covers the at least one electronic component located on the circuit board. In this way, not only electromagnetic interference between the electronic components is effectively isolated, but heat dissipation is enhanced. Moreover, the overall structure of the TOF camera module is made more compact and stable.

Another objective of the present disclosure is to provide a depth information camera module, a base assembly, a projection assembly, an electronic device and a manufacturing method thereof. In an embodiment of the present disclosure, the base body is molded on the circuit board and covers the at least one electronic component located on the circuit board, to strengthen the structural strength of the circuit board by the base body to effectively prevent the circuit board from being bent or deformed, improving the reliability of the TOF depth information camera module.

Another objective of the present disclosure is to provide a depth information camera module, a base assembly, a projection assembly, an electronic device and a manufacturing method thereof. In an embodiment of the present disclosure, the base body is separately molded by an injection molding process and mounted to the circuit board, where the base body has a receiving cavity, and when the base body is mounted to the circuit board, the at least one electronic component disposed on the circuit board is housed in the receiving cavity. In this way, the overall space utilization of the TOF depth information camera module is improved.

Another objective of the present disclosure is to provide a depth information camera module, a base assembly, a projection assembly, an electronic device and a manufacturing method thereof. In an embodiment of the present disclosure, the projection assembly is mounted on a top side of the base body, and at least a portion of the at least one electronic component is located below the projection assembly. In other words, in the present disclosure, the projection assembly is spatially stacked above a portion of the at least one electronic component. In this way, the overall space utilization of the TOF depth information camera module is improved, especially the space utilization in the height direction.

Another objective of the present disclosure is to provide a depth information camera module, a base assembly, a projection assembly, an electronic device and a manufacturing method thereof. In an embodiment of the present disclosure, the base assembly further includes a conductive element extending between the projection assembly and the circuit board to establish a connection circuit between the projection assembly and the circuit board by the conductive element. In other words, in the present disclosure, the circuit connection between the projection assembly and the circuit board is changed by the conductive element.

Another objective of the present disclosure is to provide a depth information camera module, a base assembly, a projection assembly, an electronic device and a manufacturing method thereof. In an embodiment of the present disclosure, the conductive element is integrally molded with the base body and embedded in the base body such that since the conductive element is embedded in the base body, each of the conductive elements is effectively physically isolated by the base body. In this manner, a circuit failure such as short circuit by contact between the conductive elements may be effectively avoided.

Another objective of the present disclosure is to provide a depth information camera module, a base assembly, a projection assembly, an electronic device and a manufacturing method thereof. Since the conductive element is embedded in the base body, the conductive element may be effectively protected and isolated by the base body, and the conductive element is prevented from being oxidized and consumed to improve the service life of the conductive element.

Another objective of the present disclosure is to provide a depth information camera module, a base assembly, a projection assembly, an electronic device and a manufacturing method thereof. The TOF depth information camera module satisfies the size requirement of miniaturization.

Another objective of the present disclosure is to provide a depth information camera module, a base assembly, a projection assembly, an electronic device and a manufacturing method thereof. The projection assembly has a modular structure, such that the projection assembly may participate in the assembly of the depth information camera module as a whole, thereby improving the assembly efficiency of the depth information camera module.

Another objective of the present disclosure is to provide a depth information camera module, a base assembly, a projection assembly, an electronic device and a manufacturing method thereof. The projection assembly has a modular structure such that a relative positional relationship between components within the projection assembly is previously determined prior to participation in assembly, so that after the projection assembly is mounted to the carrying portion of the base body, the cooperative relationship between the components within the projection assembly remains unchanged. In other words, the projection assembly having a modular structure facilitates ensuring the cooperation accuracy between the components within the projection assembly.

Another objective of the present disclosure is to provide a depth information camera module, a base assembly, a projection assembly, an electronic device and a manufacturing method thereof. The projection assembly has a modular structure such that when the projection assembly is damaged or fails, it may be repaired by replacement. In other words, the maintenance and repair of the depth information camera module is relatively convenient.

Another objective of the present disclosure is to provide a depth information camera module, a base assembly, a projection assembly, an electronic device and a manufacturing method thereof. The projection assembly is mounted to the carrying portion of the base body and electrically connected to the circuit board through the conductive element such that some electronic components of the projection assembly are selectively mounted to the circuit board, so that the components of the projection assembly may be relatively reduced.

Another objective of the present disclosure is to provide a depth information camera module, a base assembly, a projection assembly, an electronic device and a manufacturing method thereof. The base body has at least one anti-overflow groove, where the at least one anti-overflow groove is for preventing overflow of the conductive medium for fixing and conducting the projection assembly and the base body, causing the projection assembly to be short-circuited.

Another objective of the present disclosure is to provide a depth information camera module, a base assembly, a projection assembly, an electronic device and a manufacturing method thereof. The at least one anti-overflow groove cooperates to form a positioning mounting reference for the projection assembly, facilitating the positionally mounting of the projection assembly to the carrying portion of the base body.

Another objective of the present disclosure is to provide a depth information camera module, a base assembly, a projection assembly, an electronic device and a manufacturing method thereof. The projection assembly and the receiving assembly are disposed on the base assembly to assemble and form the TOF depth information camera module, and a support bracket in the conventional TOF depth information camera module is not needed, so there is no need to set a reserved area on the circuit board, thereby reducing the size.

Other advantages and features of the present disclosure will become apparent from the description below, and may be implemented by means and combinations particularly indicated in the claims.

To achieve at least one of the above objectives or advantages, the present disclosure provides a depth information camera module, including: a projection assembly, the projection assembly including a projection assembly circuit board and a projection unit, where the projection unit is electrically connected to the projection assembly circuit board to project a laser to a to-be-detected object after being conducted; a receiving assembly, the receiving assembly including a photosensitive element for receiving the laser reflected from the to-be-detected object; and a base assembly, the base assembly including a circuit board and a base body, the base body being supported by the circuit board, where the photosensitive element of the receiving assembly is electrically connected to the circuit board, the projection assembly circuit board is supported on a top side of the base body such that the circuit board and the projection assembly circuit board are respectively at different heights of the base assembly, where the base assembly further includes a conductive element, and the conductive element is disposed between the projection assembly circuit board and the circuit board for conducting the projection assembly to the circuit board.

In an embodiment of the present disclosure, a size of the projection assembly circuit board is smaller than a size of the circuit board.

In an embodiment of the present disclosure, a projection of the projection assembly circuit board relative to the circuit board is located within the circuit board.

In an embodiment of the present disclosure, the base body is integrally molded on the circuit board.

In an embodiment of the present disclosure, the base body is a separate component relative to the circuit board, and the base body is mounted to the circuit board.

In an embodiment of the present disclosure, the conductive element is integrally molded with the base body and embedded in the base body, the conductive element has a first electrical connection terminal and a second electrical connection terminal, the first electrical connection terminal is exposed on the top side of the base body for electrically connecting the projection assembly, and the second electrical connection terminal is electrically connected to the circuit board.

In an embodiment of the present disclosure, the conductive element is implemented as a flexible board, the flexible board extends integrally and folded between the projection assembly circuit board and the circuit board for conducting the circuit board and the projection assembly.

In an embodiment of the present disclosure, the projection assembly has an integral structure, the projection assembly circuit board has a front side and a back side opposite to the front side, the projection unit is mounted and electrically connected to the front side of the projection assembly circuit board, the projection assembly circuit board has a set of conductive terminals, the conductive terminals are located on the back side of the projection assembly circuit board, and when the projection assembly is mounted on the top side of the base body, the conductive terminals of the projection assembly are electrically connected to the first electrical connection terminals of the conductive elements respectively, to electrically connect the projection assembly to the circuit board.

In an embodiment of the present disclosure, the base body further has at least one anti-overflow groove, the at least one anti-overflow groove is formed concavely on the top side of the base body, the first electrical connection terminals of the conductive elements are respectively exposed to the at least one anti-overflow groove, and when the projection assembly is mounted on the top side of the base body, the conductive terminals of the projection assembly respectively correspond to the at least one anti-overflow groove, and are respectively electrically connected to the first electrical connection terminals of the conductive elements exposed in the at least one anti-overflow groove.

In an embodiment of the present disclosure, the depth information camera module further includes at least one electronic component, the at least one electronic component is mounted and electrically connected to the circuit board, and a portion of the at least one electronic component is located below the projection assembly circuit board.

In an embodiment of the present disclosure, the at least one electronic component includes part of electronic components of the projection assembly.

In an embodiment of the present disclosure, the projection assembly circuit board is a ceramic substrate.

In an embodiment of the present disclosure, the base body further has a heat conductive through-hole penetrating through the base body to expose the projection assembly circuit board by the heat conductive through-hole.

According to another aspect of the present disclosure, the present disclosure further provides a manufacturing method for a depth information camera module, including: providing a base assembly, where the base assembly includes a circuit board and a base body, the base body is supported on the circuit board, the base body has a carrying portion, the carrying portion is located on a top side of the base body, the base body further has an opening, and the opening corresponds to a photosensitive element mounted to the circuit board; mounting an optical filtering element and an optical lens assembly to a photosensitive path of the photosensitive element; mounting a projection assembly having a modular structure to the carrying portion of the base body; and electrically connecting the projection assembly to the circuit board.

In an embodiment of the present disclosure, the base assembly further includes a conductive element, the conductive element is integrally molded with the base body and embedded in the base body, the conductive element has a first electrical connection terminal and a second electrical connection terminal, the first electrical connection terminal is exposed on the top side of the base body for electrically connecting the projection assembly, and the second electrical connection terminal is electrically connected to the circuit board.

In an embodiment of the present disclosure, the electrically connecting the projection assembly to the circuit board includes: aligning conductive terminals located on a back side of a projection assembly circuit board of the projection assembly with at least one anti-overflow groove disposed on the carrying portion of the base body respectively; applying a conducting medium to the at least one anti-overflow groove; and electrically connecting the conductive terminals to the first electrical connection terminals of the conductive elements, the conducting medium is sealed in the at least one anti-overflow groove.

In an embodiment of the present disclosure, the base assembly further includes a conductive element, the conductive element is implemented as a flexible board, and the flexible board extends integrally and folded between the projection assembly circuit board and the circuit board for conducting the circuit board and the projection assembly.

In an embodiment of the present disclosure, the electrically connecting the projection assembly to the circuit board includes: folding the flexible board such that the projection assembly is overlapped with the carrying portion of the base body.

According to another aspect of the present disclosure, the present disclosure further provides an electronic device, including: an electronic device body; and a depth information camera module as described above, where the depth information camera module is assembled to the electronic device body for acquiring depth image information.

Further objectives and advantages of the present disclosure will be fully realized from the understanding of the following description and accompanying drawings.

These and other objectives, features and advantages of the present disclosure will be fully realized by the following detailed description, accompanying drawings and claims.

DETAILED DESCRIPTION OF EMBODIMENTS

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

It should be understood by those skilled in the art that in the disclosure of the present disclosure, the orientation or positional relationships indicated by the terms "longitudinal", "lateral", "above", "below", "front", "back", "left", "right", "vertical", "horizontal", "top", "bottom", "inside", "outside" or the like are based on the orientation or positional relationship shown in the accompanying drawings, which is merely for convenience of describing the present disclosure and simplifying the description, and is not intended to indicate or imply that the device or element referred to must have a specific orientation, is constructed and operated in a specific orientation, and thus the terminology is not to be construed as limiting the present disclosure.

It may be understood that the term "one" should be understood as "at least one" or "one or more", that is, in an embodiment, the number of one element may be one, while in other embodiments, the number of the element may be plural, and the term "one" cannot be construed as a limitation on the quantity.

Figure 1:
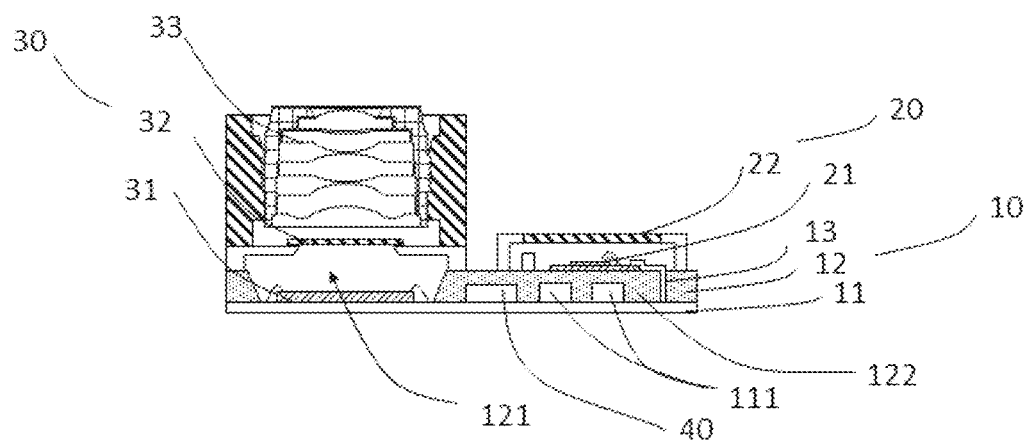
FIG. 1 is a cross-sectional schematic diagram of a TOF depth information camera module according to an embodiment of the present disclosure.
Figure 10:
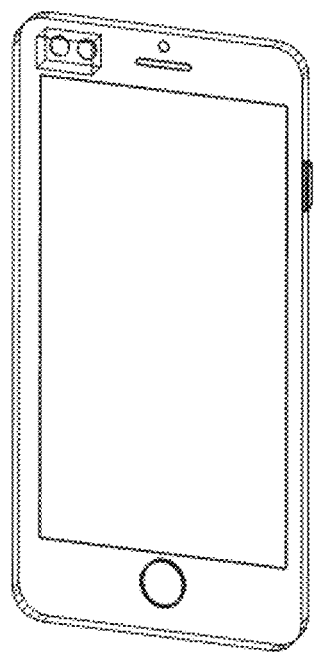
FIG. 10 is a stereoscopic schematic diagram of the TOF depth information camera module assembled to a mobile terminal provided by the present disclosure.

As shown in FIG. 1, a TOF depth information camera module according to an embodiment of the present disclosure is illustrated, where the TOF depth information camera module may be applied to various mobile terminals (as in FIG. 10), for example, but not limited to smart phones, wearable devices, computer devices, televisions, cameras, surveillance equipments, etc. As mentioned above, the integration degree of the mobile terminals is getting higher and higher, and they continue to develop to become miniaturized and thin, which means that the assembly space reserved for the TOF depth information camera module by the mobile terminals will be constantly reduced. However, for the TOF depth information camera module, the number and size of electronic components on the circuit board are difficult to reduce. At the same time, due to the limitation of the surface mounting process adopted by the existing electronic components, it is necessary to reserve space between the components. The length and width sizes of the TOF depth information camera module in the prior art are difficult to be compressed, occupying the design space inside the mobile terminals. Obviously, there is a constant need for a TOF depth information camera module that can satisfy three-dimensional imaging performance and meet the requirement of miniaturization.

At the same time, in the TOF depth information camera module, the projection assembly is smaller relative to the size of the receiving assembly, especially in the height direction. Especially in the TOF depth information camera module, the difference in size between the projection assembly and the receiving assembly is very large. In the existing technology, the metal outer bracket is used to assemble in a split type or the two assemblies are mounted on the same circuit board, the disadvantages of large length and width and insufficient utilization of height space are exhibited.

The present disclosure aims to provide a TOF depth information camera module, where the electronic components of the TOF depth information camera module (including active and passive electronic components such as capacitor resistors and photosensitive elements) are mounted on a circuit board, and at the same time a base is mounted on the circuit board and also a light window is provided, and the lens assembly of the receiving assembly and the projection assembly of the TOF depth information camera module are mounted on a top side surface of a base assembly.

Further, if the conventional mirror attaching process is used for mounting, there are problems such as the difficulty in molding the bracket, the assembly accuracy of the projection assembly and the receiving assembly is difficult to meet the requirements, and the flatness of the integral circuit board is difficult to meet the requirements. The present disclosure further provides a base assembly integrally molded by the molding process, which is integrally molded on the circuit board to provide stable support to reinforce the flatness of the circuit board.

At the same time, the base assembly may cover one or more electronic components attached to the circuit board, and in some cases may cover the non-photosensitive area of the photosensitive element, reduce the electromagnetic interference and the escaping space between the electronic components and the photosensitive element, further effectively reducing the length and width sizes of the TOF depth information camera module.

As shown in FIG. 1, the TOF depth information camera module of the present disclosure includes a base assembly 10, a projection assembly 20 and a receiving assembly 30. The base assembly 10 includes a circuit board 11 and a base body 12. The projection assembly 20 includes a projection unit 21 and an optical element 22. The receiving assembly 30 includes a photosensitive element 31, an optical filtering element 32 and an optical lens assembly 33. The projection assembly 20 and the receiving assembly 30 are respectively disposed on the base assembly 10, and the projection assembly 20 and the photosensitive element 31 of the receiving assembly 30 are mounted at different relative height positions of the base assembly 10, as illustrated in the figure, the projection assembly 20 is located on a top side surface of the base assembly 10, and the photosensitive element 31 of the receiving assembly 30 is disposed on the circuit board 11 of the base assembly 10. The projection assembly 20 projects a laser. After the laser is projected onto a spatial object, reflection occurs, and the reflected laser is received by the receiving assembly 30. By comparing the time difference or the waveform phase difference of the laser, corresponding depth information of the spatial object is obtained. Thus, a three-dimensional image is generated by computing by a processor 40, preferably, the processor 40 is integrated into the base assembly 10. It is worth mentioning that the processor 40 may also be integrated in a mobile terminal, and the TOF depth information camera module is communicably connected to the mobile terminal to implement computation of 3D images.

The projection unit 21 is a projection light source and is located on the top side of the base assembly 10 and projects a laser. The optical element 22 is located on the laser projection optical path, that is, the laser passes through the optical element 22 and is projected to the spatial object. Preferably, the projection unit 21 may be a VCSEL array, which may emit a modulated infrared laser; the projection unit 21 may also be other light sources, such as LEDs, and may emit a modulated laser. Preferably, the optical element 22 may be implemented as frosted glass to diffusely reflect the laser emitted by the projection unit 21 such that the projection assembly 20 projects a larger range of laser. The optical element 22 may also be implemented as an optical diffraction element or the like. It may be understood that the optical element 22 does not change the characteristics of the laser emitted by the projection unit 21, such as a laser waveform, a wavelength, and the optical element 22 only replicates and diffuses the laser to make the projection range or effect better.

The photosensitive element 31 is disposed on the base assembly 10 and electrically connected to the circuit board 11 of the base assembly 10. The reflected laser sequentially passes through the optical lens assembly 33 and the optical filtering element 32, and is received by the photosensitive element 31, such that the photosensitive element 31 may receive the reflected laser. Then, the time difference or phase difference between the projection unit 21 projecting a laser and the photosensitive element 31 receiving the emitted laser is used to obtain depth information corresponding to the spatial object, and a three-dimensional image is generated by the processor 40.

Figure 2:
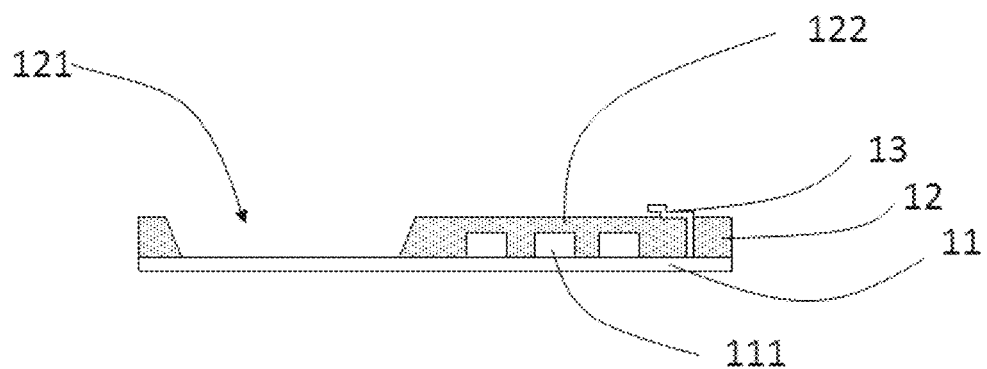
FIG. 2 is a cross-sectional schematic diagram of a base assembly according to the embodiment.

FIG. 2 is a schematic diagram of a base assembly according to the present disclosure. The base body 12 of the base assembly is disposed at an upper end of the circuit board 11 and at least one set of electronic components 111 on the upper surface of the circuit board 11 is covered by the base body 12, and the base body 12 may protect the at least one set of electronic components 111 to improve the service life of the corresponding components. It may be understood that the height of the base body 12 along the direction of the light is higher than or equal to the height of any one of the at least one set of electronic components 111, thereby fully encapsulating the electronic components. The base body 12 has an opening 121, and the photosensitive element 31 is electrically connected to and disposed on the circuit board 11. The reflected laser may be projected to the photosensitive element 31 through the opening 121, that is, the opening 121 is located on the photosensitive path of the photosensitive element.

The base body 12 further includes a carrying portion 122, and the projection unit 21 is located on the upper surface of the carrying portion 122. It is worth mentioning that the upper surface and the upper portion referred to in the present disclosure refer to that the photosensitive surface of the photosensitive element or the direction of the light emitting surface of the projection unit or the direction in which the projection unit emits laser is upward, which may also be understood as the axial direction. It may be understood that between the upper surface of the carrying portion 122 and the circuit board 11, a molding material is molded on the circuit board 11 in the molding process, and a large number of electronic components are encapsulated therebetween. It is understood that the projection unit 21 is stacked and disposed at the upper end of the electronic components.

The projection unit 21 is disposed on the carrying portion 122 at an angle with the photosensitive element 31, and the angle ranges from 0 to 90°. For example, the projection unit 21 is at 0° with the photosensitive element 31. That is, the surface of the projection unit 21 is kept parallel to the surface of the photosensitive element 31. In the present embodiment, the upper surface of the opening 121 is flush with the upper surface of the carrying portion 122, that is, the height difference between the projection unit 21 and the photosensitive element 31 is close to or equal to the axial height of the opening 121. It may be understood that the distance from the optical lens assembly 33 corresponding to the receiving assembly to the photosensitive element 31 needs to be set according to the characteristics of the optical lens assembly 33 and is a fixed value. Therefore, setting the opening 121 may reduce the axial size of the TOF depth information camera module.

Figure 3:
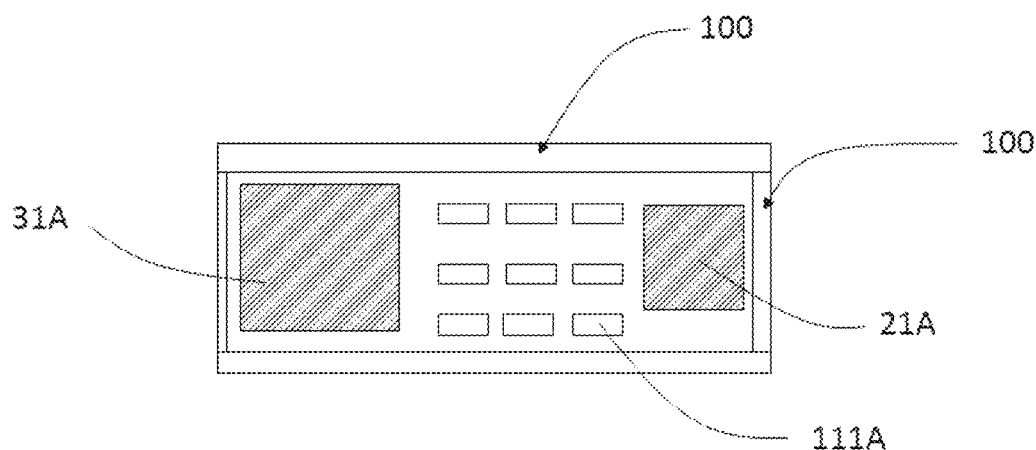
FIG. 3 is a cross-sectional schematic diagram of a circuit board of an existing TOF depth information camera module.

FIG. 3 is a schematic diagram of a circuit board of an existing TOF depth information camera module. For the circuit board corresponding to the receiving assembly and the projection assembly of the TOF depth information camera module, regardless of whether the circuit board is an integral circuit board, the corresponding projection unit, photosensitive element and electronic components are respectively disposed on the circuit board without interference, thereby causing the overall size of the TOF depth information camera module being too large. The base body 12 of the present disclosure is integrally molded on the circuit board 11 by a molding technique, the base body 12 may cover the electronic components, and the projection unit 21 is disposed on the upper surface of the carrying portion 122 of the base body 12. It may be understood that the projection unit 21 is stacked and disposed at an upper end of the at least one set of electronic components 111, thereby reducing the size.

Further, in the prior art, the optical lens assembly and the optical element need to be disposed on a support bracket, and the support bracket needs to be disposed on the circuit board, so that the circuit board must reserve a reserved area 100 for placing the support bracket, the width of the reserved area 100 is at least greater than the width of the circuit board. The base body 12 of the present disclosure is integrally formed on the circuit board 11 by a molding process, and no reserved area is needed. The size of the corresponding TOF depth information camera module may be further reduced.

The base body 12 of the present disclosure is integrally molded on the circuit board 11 by a molding process. The base body 12 is highly stable, and the deformation of the circuit board 11 may be prevented from affecting the imaging effect of the TOF depth information camera module. Furthermore, the base body 12 has an extremely high degree of flatness, so that assembly of the projection unit 21, the optical element 22, and the optical lens assembly 33 is less difficult.

It should be understood by those skilled in the art that at least one conductive element 13 may be disposed on the base body 12, and the conductive element 13 may electrically conduct the projection unit 21 to the circuit board 11, thereby causing the projection unit 21 to be conducted to project a laser. In order to better understand the conductive element 13, for example, the conductive element 13 is a conductive material such as a copper post or a copper wire. When molding the base body 12 on the circuit board, the conductive material is placed at a corresponding position, that is, the conductive element 13 is molded in the base body 12. The conductive element 13 has at least two joints 131 connecting the circuit board 11 and the projection unit 21 respectively, so that the projection unit 21 may be conducted to project a laser.

Figure 4:
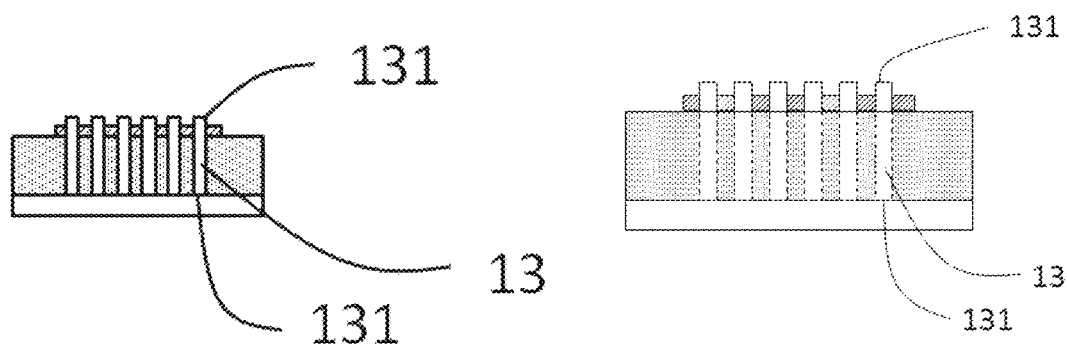
FIG. 4 is a layout schematic diagram of a conductive element on a base body according to the embodiment.
Figure 7:
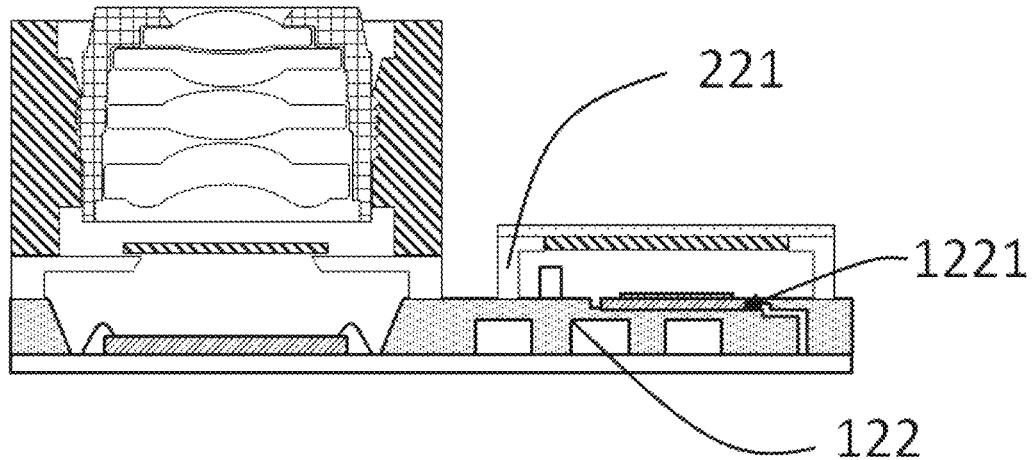
FIG. 7 is a cross-sectional schematic diagram of another modified embodiment of the TOF depth information camera module according to the embodiment.

As is shown in FIG. 4, is a partial schematic diagram of a projection assembly of the present disclosure. It may be understood that when the number of the conductive elements 13 is more than 1, each of the conductive elements 13 does not interfere with each other, thereby preventing a short circuit. For example, the carrying portion 122 is also provided with other components (not shown), for example, NTC for detecting the temperature of the surface of the projection unit, and the NTC also needs to communicate with the circuit board 11 through the conductive element 13. As shown in FIG. 7, those skilled in the art should understand that when the optical element 22 is disposed on the base body 12, the optical element 22 further includes a support portion 221 for supporting. The support portion 221 is used to support frosted glass or optical diffraction elements, and the optical element 22 forms a sealed space with the carrying portion 122 of the base body 12. The projection of the projection unit 21 generates a large amount of heat, and the NTC may be used to detect the temperature of the sealed space. When the temperature is too large, the NTC causes the projection unit 21 to be electrically disconnected.

Figure 6:
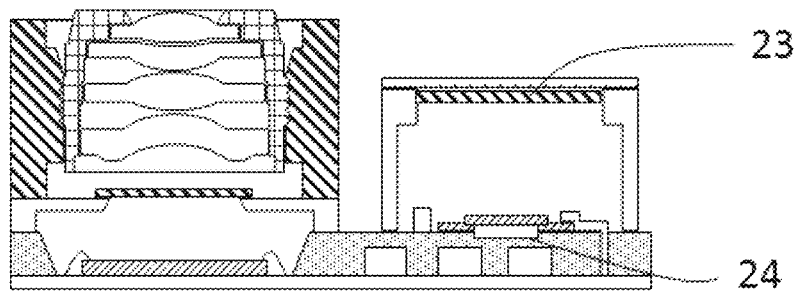
FIG. 6 is a cross-sectional schematic diagram of another modified embodiment of the TOF depth information camera module according to the embodiment.

As shown in FIG. 6, a surface of the optical element 22 may further be provided with a monitoring element 23. The monitoring element 23 is attached to the surface of the optical element 22, and the monitoring element 23 is made of a transparent material and does not affect the laser emitted by the projection unit 21 or the optical performance of the optical element 22. The monitoring element 23 communicates with the circuit board 11 through the conductive element 13, so that the optical element 22 may be monitored. For example, the monitoring element 23 is an ITO film. When the optical element 22 is damaged or contains impurities or water vapor, the electrical properties of the ITO film may change. The electrical properties may be capacitance between ITO films and ITO film resistance, so that the optical element 22 is monitored to make the projection more secure.

It is worth mentioning that the implementation of the conductive element 13 in the embodiment in FIG. 2 is only an example based on the molding process. The conductive element 13 may also be welded to the circuit board 11 by an external welding method or by engraving a circuit on the surface of the integrated base 10 or the like to conduct the projection unit to the circuit board 10. It may be understood that the conductive element 13 is only for realizing conductive connection of the projection unit 21, the monitoring element 23 or other electronic components to the circuit board 11, and the position, shape and formation of the conductive element 13 does not constitute limitations to the present disclosure.

The present disclosure illustrates a method for manufacturing a base assembly. The circuit board 11 is placed on a lower mold, and an upper mold is covered thereon. The upper and lower molds form a passage, and the molding material is injected to form the base body 12. It may be understood that the upper mold has a pressure head which is pressed against the circuit board 11 after the mold clamping so that the opening 121 of the base body 12 is formed. The projection assembly and the receiving assembly of the present disclosure may share an integral circuit board or use split circuit boards.

The present disclosure illustrates a TOF depth information camera module assembly method, including providing the base assembly 10, and disposing the projection unit 21 and the photosensitive element 31 respectively on the base assembly 10. It is worth mentioning that the projection unit 21 is disposed on the upper surface of the carrying portion 122 of the base body 12, and is electrically connected to the circuit board 11 through the conductive element 13. Preferably, the photosensitive element 31 is disposed on the surface of the circuit board 11 and is electrically connected to the circuit board 11 by wire bonding, such as a gold wire. The photosensitive element 31 may also be conducted to the circuit board by solder balls or the like. The optical element 22 is disposed above the carrying portion 122 of the base body 12. Preferably, an effective working area of the optical element 22 is located at an upper end of the projection unit 21, so that the effect of duplicating and diffusing the laser by the optical element 22 is better. Next, the optical filtering element 32 and the optical lens assembly 33 are sequentially disposed on the photosensitive path of the photosensitive element 31. The optical filtering element 32 filters out the light of the wavelength other than the laser emitted by the projection unit 21. Therefore, the photosensitive element receives only the laser that is reflected by the spatial object projected by the projection unit 21. It is worth mentioning that the optical filtering element 32 may be directly disposed on the base body 12. A support element may also be placed, which is disposed on the base body 12. Compared to being placed directly on the base body 12, the support element may reduce stress on the optical filtering element. The optical axis of the optical lens assembly 33 is preferably perpendicular to the photosensitive surface of the photosensitive element 31 to make the receiving effect better.

Figure 5:
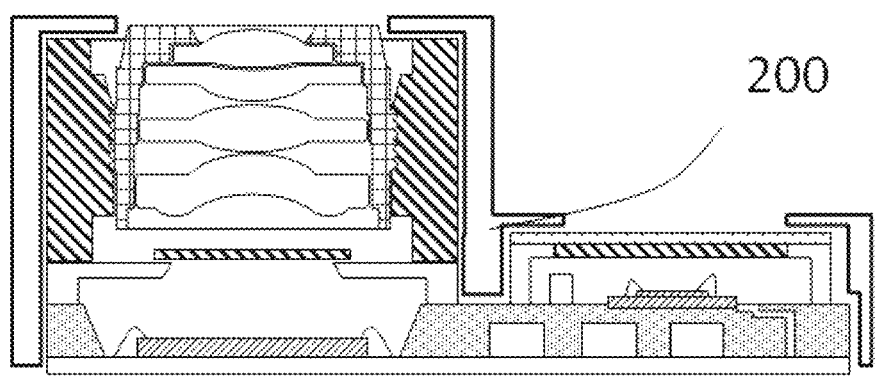
FIG. 5 is a cross-sectional schematic diagram of a modified embodiment of the TOF depth information camera module according to the embodiment.

As shown in FIG. 5, in a modified embodiment of an embodiment of the present disclosure, the TOF depth information camera module further includes an outer bracket 200, and the projection assembly and the receiving assembly are housed in the outer bracket 200. The outer bracket has two openings such that the laser projected by the projection assembly may be projected on the surface of the spatial object, and the reflected laser may enter the receiving assembly through another opening. The outer bracket may prevent the relative position of the projection assembly and the receiving assembly from changing or causing other damage when the TOF depth information camera module receives an impact.

FIG. 6 is a schematic diagram of the TOF depth information camera module according to another modified embodiment of the present disclosure. As shown in the figure, the projection assembly further includes a heat dissipation element 24 disposed on the surface of the carrying portion 122, and the projection unit 21 is disposed on the heat dissipation element 24. When the projection unit 21 projects a laser, a large amount of heat is generated, the heat may be dissipated more quickly through the heat dissipation element 24. The heat dissipation element 24 may be a metal plate, a ceramic substrate or the like, that is, a material having good thermal conductivity.

FIG. 7 is a schematic diagram of the TOF depth information camera module according to another modified embodiment of the present disclosure. The carrying portion 122 of the base body 12 further has a placement groove 1221, and the projection unit 21 is disposed in the placement groove 1221. That is, in the present embodiment, the axial distance between the projection unit 21 and the photosensitive element 31 is less than the height of the opening 121. It may be understood that different optical elements have different optical performances, and in order to make the effect of diffusion and republication better without affecting the characteristics of the projected laser, the distance from the projection unit 21 to the optical element 22 varies with the characteristics of the optical element 22, so that the placement groove 1221 may effectively reduce the size of the module for an oversized projection assembly. Generally, the height of the projection assembly 20 is less than that of the receiving assembly 30, so that the height difference between the photosensitive element 31 and the projection unit 21 may be adjusted so that the upper surfaces of the optical element 22 and the optical lens assembly 33 may be flush.

Figure 8:
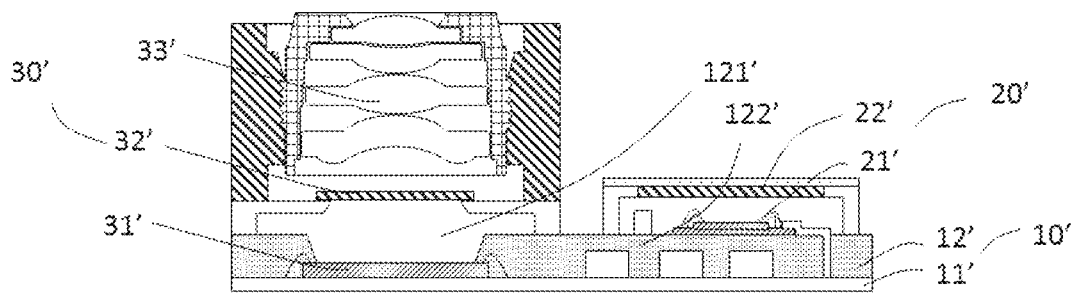
FIG. 8 is a cross-sectional schematic diagram of another modified embodiment of the TOF depth information camera module according to the embodiment.

FIG. 8 is a schematic diagram of the TOF depth information camera module according to another preferred embodiment of the present disclosure. The assembly method of the TOF depth information camera module is different from that of the first preferred embodiment. The TOF depth information camera module includes a base assembly 10', a projection assembly 20' and a receiving assembly 30', the projection assembly 20' and the receiving assembly 30' are respectively disposed on the base assembly 10', and the projection assembly 20' and the receiving assembly 30' are mounted at different relative height positions of the base assembly 10'. As illustrated in the figure, the projection assembly 20' is located on the top side surface of the base assembly 10', and the photosensitive element of the receiving assembly 30' is disposed on the circuit board 11' of the base assembly.

It should be noted that, in an embodiment of the present disclosure, the photosensitive element 31' is pre-disposed on the circuit board 11' and electrically connected to the circuit board 11'. The base body 12' is disposed at the upper end of the circuit board 11'. Next, the projection assembly 20' is disposed on the upper surface of the carrying portion 122' of the base body 12', and the optical filtering element 32 and the optical lens assembly 33 are sequentially disposed on the photosensitive path of the photosensitive element 31.

The photosensitive element 31' is electrically connected to the circuit board 11' by a gold wire process, and the photosensitive element 31' and the circuit board 11' have gold wires. Due to the small size of the gold wire, its strength is relatively weak, and it is easily broken by external forces. In the present disclosure, the photosensitive element 31' is pre-disposed on the circuit board 11', and after the base body 12' is molded, the base body 12' may cover the gold wire to protect the gold wire. It is worth mentioning that the height of the base body 12' is higher than the highest point of the gold wire from the circuit board 11' so that the gold wire may be covered. It may be understood that the base body 12' may fully cover the gold wire. It may also cover a portion of the gold wire, i.e., the portion of the gold wire adjacent to the photosensitive element 31' is exposed.

In the present disclosure, the photosensitive element 31' is pre-disposed on the circuit board 11', so that when the base body 12' is disposed, there is no need to reserve a space to electrically connect the photosensitive element 31' to the circuit board 11' by a gold wire. Therefore, the size of the opening 121' of the base body 12' located on the photosensitive element 31' is smaller than that of the opening 121' when the photosensitive element is later disposed on the circuit board. Therefore, pre-disposing the photosensitive element 31' on the circuit board 11' may further reduce the size of the base assembly 10'.

Figure 9:
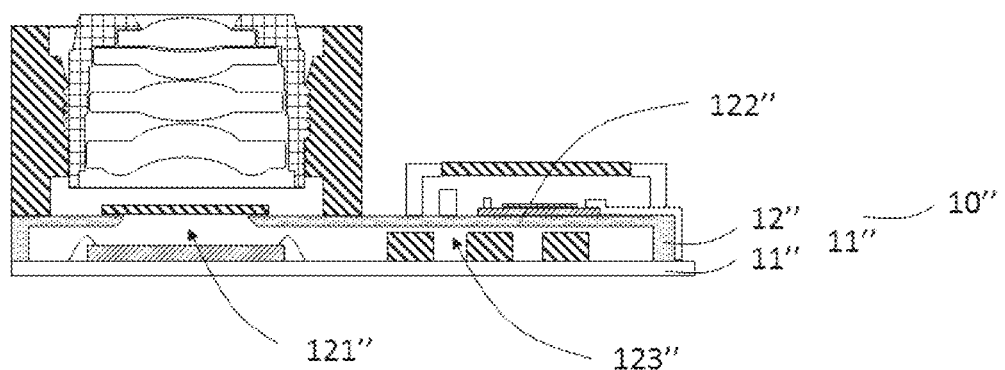
FIG. 9 is a cross-sectional schematic diagram of another modified embodiment of the TOF depth information camera module according to the embodiment.

FIG. 9 shows another preferred embodiment of the present disclosure. As shown in the figure, the base assembly 10" includes a circuit board 11" and an integral base mounted to a bracket 12" of the circuit board 11". The bracket 12" is disposed at an upper end of the circuit board 11" and houses electronic components disposed on the circuit board 11". The bracket 12" has an opening 121" located on the photosensitive path of a photosensitive element 31". The bracket 12" further includes a carrying portion 122", and the projection unit 21" is located on the upper surface of the carrying portion 122". It may be understood that a receiving cavity 123" is between the upper surface of the carrying portion 122" and the circuit board 11" for receiving the electronic components of the circuit board 11".

It may be understood that the abovementioned base body adopts a molding process to cover the electronic components, and the bracket 12" may be formed by a process such as powder injection molding, die casting, and the receiving cavity 123" is disposed to house the electronic components. Preferably, the upper surface of the opening 121" and the carrying portion 122" are flush to reduce the processing difficulty of the bracket 12" and improve the processing accuracy thereof. Preferably, the bracket 12" is made of a material having high thermal conductivity, such as a metal material, and heat generated by the projection unit 21" may be rapidly transmitted, thereby achieving rapid heat dissipation. In another preferred modified embodiment of the present disclosure, when the bracket 12" is made of a conductive material, its surface has an insulating layer, and at least one conductive element 13" is disposed on the insulating layer. Therefore, the projection unit 21" may be conductively connected to the circuit board 11". It is worth mentioning that the conductive elements 13" are independent of each other to ensure that short-circuiting does not occur, and the position, shape and formation of the conductive element 13" does not constitute limitations to the present disclosure.

Figure 11:
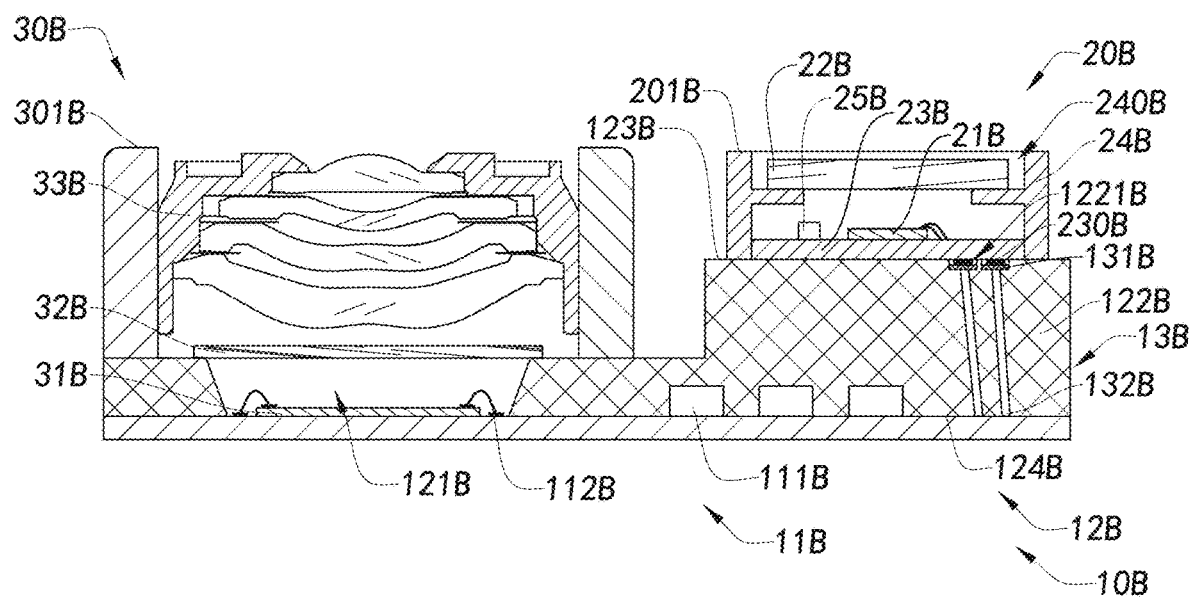
FIG. 11 is a cross-sectional schematic diagram of a TOF depth information camera module according to another preferred embodiment of the present disclosure.

As shown in FIG. 11, the TOF depth information camera module according to another preferred embodiment of the present disclosure is illustrated, where the TOF depth information camera module may be assembled on a mobile terminal (including but not limited to a smart phone, a tablet computer, a laptop computer, a smart wearable device, etc.), to acquire depth information of a to-be-detected object by the TOF depth information camera module. In particular, in a specific application, the TOF depth information camera module may be applied to acquire three-dimensional image information of a to-be-detected face (i.e., the to-be-detected object is the to-be-detected face), so that the mobile terminal may realize various types of application development based on the acquired three-dimensional face image information, for example, facial recognition smart unlocking, facial recognition mobile payment, or the like.

The TOF depth information camera module operates based on Time of Flight (TOF), which includes a projection assembly 20B, a receiving assembly 30B, and a circuit board 11B. The projection assembly 20B and the receiving assembly 30B are respectively conducted to the circuit board 11B. During operation, the projection assembly 20B is activated to generate a laser having a predetermined wavelength for a to-be-detected object, and the receiving assembly 30B is configured to receive the laser reflected by the to-be-detected object. The measurement of the three-dimensional structure or the three-dimensional contour of the to-be-detected object is realized by measuring the time interval t of the laser from emitting to reception (often referred to as pulse ranging method) or the phase generated by the round trip to the to-be-detected object (often referred to as phase difference ranging method).

As described above, the existing TOF depth information camera module generally mounts and electrically connects the projection assembly and the receiving assembly to the same circuit board. Therefore, the relative positional relationship between the projection assembly and the receiving assembly is determined by the circuit board. However, since the projection assembly and the receiving assembly generally have inconsistent size configurations, and in particular, the overall size of the projection assembly is smaller than the size of the receiving assembly, when the projection assembly and the receiving assembly are simultaneously mounted and electrically connected to the same circuit board, the height space formed by the height difference between the projection assembly and the receiving assembly is idle.

Moreover, from the overall appearance, since there is a gap between the top surfaces of the projection assembly and the receiving assembly, the existing TOF depth information camera module does not have a flat top surface, which makes it difficult to adapt to the installation requirements of the current mobile terminals (most mobile terminals, such as smart phones have flat housings).

At the same time, since both the projection assembly and the receiving assembly are mounted and electrically connected to the circuit board, such a layout causes the horizontal direction (length and width direction) of the circuit board to be excessively large. These dimensional defects may become more apparent as the mobile terminals continue to develop to become miniaturized and thin, and become a major constraint that obstructs the expansion of the application range of the TOF depth information camera module.

Correspondingly, as shown in FIG. 11, in the embodiment of the present disclosure, on the one hand, the TOF depth information camera module adjusts the installation layout of the projection assembly 20B and the receiving assembly 30B relative to the circuit board 11B through a special configuration of a base assembly 10B, thereby improving the overall space utilization of the TOF depth information camera module and reducing the final molding size thereof. On the other hand, in the embodiment of the present disclosure, the projection assembly 20B is configured to be an integral projection assembly having a modular structure to improve assembly efficiency of the projection assembly 20B and performance of the projection assembly itself.

More specifically, as shown in FIG. 11, in the embodiment of the present disclosure, the base assembly 10B includes a base body 12B and the circuit board 11B, where the base body 12B is supported by the circuit board 11B for mounting the projection assembly 20B and the receiving assembly 30B at different heights of the base assembly 10B. In this way, the arrangement of the projection assembly 20B and the receiving assembly 30B is spatially misaligned, so as to eliminate the defect of insufficient space utilization caused by the size difference configuration of the projection assembly 20B and the receiving assembly 30B.

Figure 12:
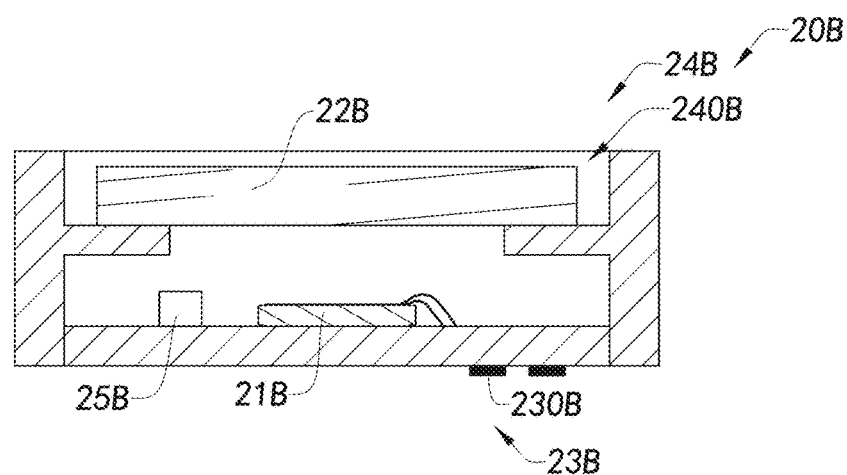
FIG. 12 is a cross-sectional schematic diagram of the projection assembly of the TOF depth information camera module according to the above preferred embodiment of the present disclosure.

As shown in FIG. 12, in the present disclosure, the projection assembly includes a projection unit 21B, an optical element 22B, a projection assembly circuit board 23B, and an outer case 24B, where the outer case 24B is mounted on the projection assembly circuit board 23B. The projection unit 21B is electrically connected to the projection assembly circuit board 23B and housed in the outer case 24B to obtain an external power source for the projection unit 21B by the projection assembly circuit board 23B. Accordingly, after the projection assembly circuit board 23B is conducted, the projection unit 21B can be activated to generate a laser having a predetermined wavelength. The optical element 22B is supported by the outer case 24B and held in the laser projection path of the projection unit 21B for modulating the laser generated by the projection unit 21B. In particular, in the embodiment of the present disclosure, the optical element 22B is supported at the top end of the outer case 24B to define and form an exit end of the projection assembly 20B. Thereby, the laser modulated by the optical element 22B can pass through the exit end and radiate to the outside.

Of course, those skilled in the art should understand that in another embodiment of the present disclosure, the optical element 22B may be mounted at other positions of the outer case 24B. For example, the optical element 22B is supported in an intermediate area of the outer case 24B and corresponds to the projection unit 21B. Accordingly, the outer case 24B has an opening 240B that corresponds to the optical element 22B to define and form an exit end of the projection assembly 20B through the opening 240B.

In a specific implementation, the projection unit 21B may be implemented as a VBSEL (Vertical Cavity Surface Emitting Laser) or an LED light source or the like, or the projection unit 21B may be arranged as an array light source, that is, the projection unit 21B is implemented as a VBSEL array or an LED light source array or the like. This is not limited by the present disclosure. Accordingly, the optical element 22B may be implemented as an optical diffraction element that functions to replicate and diffuse the laser generated by the projection unit 21B without changing the characteristics (e.g., waveform, wavelength, etc.) of the laser, so that the projection unit 21B has a wider laser projection range and a better projection effect. Alternatively, the optical element 22B may also be implemented in other types, such as frosted glass or the like. When the laser generated by the projection unit 21B is applied to the frosted glass, the laser is diffusely reflected at the frosted glass to increase the laser projection range of the projection assembly 20B.

Of course, those skilled in the art may understand that in the specific implementation of the projection assembly 20B, the projection assembly 20B may be configured with other elements according to the specific requirements for the TOF depth information camera module. For example, in a specific implementation, the projection assembly 20B may further include a detecting element 25B (e.g., NTC, PD) or the like to detect the laser intensity of the projection unit. This is not limited by the present disclosure.

Accordingly, in the present disclosure, the receiving assembly 30B includes a photosensitive element 31B, an optical filtering element 32B, and an optical lens assembly 33B. The photosensitive element 31B is configured to receive the reflected laser from the to-be-detected object and generate an inductive signal to implement acquisition of the depth information. The optical filtering element 32B and the optical lens assembly 33B are respectively held in the photosensitive path of the photosensitive element 31B. The optical lens assembly 33B is configured to acquire reflected laser from the to-be-detected object, and the optical filtering element 32B is configured to filter stray light so that only laser having the predetermined wavelength can pass through the optical filtering element 32B and reach the photosensitive element 31B and react. Of course, those skilled in the art should understand that other elements may be configured according to the specific requirements for the TOF depth information camera module. For example, in a specific implementation, the receiving assembly 30B is configured with a lead 112B for electrically connecting the photosensitive element 31B to of the circuit board 11B. This is not limited by the present disclosure.

As described above, in the embodiment of the present disclosure, the base assembly 10B includes the base body 12B and the circuit board 11B, where the base body 12B is supported by the circuit board 11B for mounting the projection assembly 20B and the receiving assembly 30B at different heights of the base assembly 10B. More specifically, in the embodiment of the present disclosure, the receiving assembly 30B is mounted on the circuit board 11B, while the projection assembly 20B is mounted on the top side of the base body 12B. In other words, the circuit board 11B of the base assembly 10B provides a first mounting position for the receiving assembly 30B, and the base body 12B of the base assembly 10B provides a second mounting position for the projection assembly 20B. Therefore, the base assembly 10B may adjust a relative positional relationship between the projection assembly 20B and the receiving assembly 30B to meet the size and assembly requirements of the TOF depth information camera module.

As shown in FIG. 11, in the embodiment of the present disclosure, the photosensitive element 31B of the receiving assembly 30B is mounted on the circuit board 11B of the base assembly 10B. The optical lens assembly of the receiving assembly 30B is mounted on the base body 12B to be held in the photosensitive path of the photosensitive element 31B. Accordingly, in order to enable the receiving assembly 30B to have a complete photosensitive channel, the base body 12B has an opening 121B, where the opening 121B corresponds to the photosensitive path of the photosensitive element 31B. Therefore, the light acquired by the optical lens assembly 33B can pass through the opening 121B and finally reach the photosensitive element 31B and react. Further, in the embodiment of the present disclosure, the optical filtering element 32B of the receiving assembly 30B is also mounted on the base body 12B such that the optical filtering element 32B is held in the photosensitive path of the photosensitive element 31B. Thus, the light acquired by the optical lens assembly 33B can be effectively filtered by the optical filtering element 31B to ensure the final imaging quality of the receiving assembly 30B.

It is worth mentioning that in another embodiment of the present disclosure, the configuration and mounting position of the optical filtering element 32B may be adjusted accordingly. For example, the optical filtering element 32B may be implemented as an optical filtering film attached to one side of any of the optical lenses in the optical lens assembly 33B to filter the light acquired by the optical lens assembly 33B. For example, the optical filtering element 32B may be mounted in the optical lens assembly 33B, e.g., mounted on the top side of the optical lens assembly, the bottom side of the optical lens assembly, or the like to achieve the same effect of filtering the stray light. It should be noted that when the optical filtering element 32B is mounted in the optical lens assembly 33B, the overall height size of the receiving assembly 30B may be reduced to facilitate the overall size design of the TOF depth information camera module.

In particular, as shown in FIG. 11, in the embodiment of the present disclosure, the projection assembly 20B is mounted to the top side 123B of the base body 12B. More specifically, the projection assembly 20B is mounted on a carrying portion 122B located on the top side 123B of the base assembly.

As can be seen from the description of the installation of the projection assembly 20B and the receiving assembly 30B, on the one hand, in the embodiment of the present disclosure, the base body 12B of the base assembly 10B simultaneously provides mounting positions for the optical lens assembly 33B and/or the optical filtering element 32B of the receiving assembly 30B and the projection assembly 20B. Therefore, the cooperative relationship between the components of the receiving assembly 30B and the mutual cooperative relationship between the receiving assembly 30B and the projection assembly 20B may all be adjusted by the base body 12B of the base assembly 10B. In other words, the base body 12B provides a unified reference for the cooperation between the components of the receiving assembly 30B and the mutual cooperation between the receiving assembly 30B and the projection assembly 20B, to facilitate adjustment and improve the overall cooperation accuracy of the TOF depth information camera module.

On the other hand, since the projection assembly 20B is provided to be mounted on the carrying portion 122B on the top side of the base body 12B, thus, an area of the circuit board 11B which is originally reserved for mounting the projection assembly 20B is released as compared with the prior technical solution of mounting and electrically connecting the projection assembly to the circuit board. As mentioned above, the projection assembly 20B and the receiving assembly 30B themselves have an inconsistent size configuration such that when the projection assembly and the receiving assembly are simultaneously mounted and electrically connected to the circuit board, naturally, a portion of the height space is idle. In conjunction with the above description, it may be understood that the base assembly 10B provided by the present disclosure utilizes the idle height space in the existing TOF camera module to optimize the high space utilization of the TOF depth information camera module.

More specifically, in the embodiment of the present disclosure, since the projection assembly 20B is mounted on the top side of the base body 12B, the circuit board 11B need not be provided with a circuit board area for mounting the projection assembly 20B. Accordingly, on the one hand, the size (length and width sizes) of the circuit board 11B in the horizontal direction may be appropriately reduced; on the other hand, the circuit board area originally scheduled to mount the projection assembly 20B can be utilized for mounting at least one electronic component 111B that should be mounted on the circuit board 11B. Here, as shown in FIG. 11, at least a portion of the at least one electronic component 111B may be disposed to be mounted on a corresponding area of the circuit board 11B below the projection assembly 20B to occupy the circuit board space originally used to mount the projection assembly 20B. In other words, in the embodiment of the present disclosure, the projection assembly 20B is spatially stacked above a portion of the at least one electronic component 111B. In this way, the overall space utilization of the TOF depth information camera module is improved, especially the space utilization in the height direction.

As can be seen, in the present disclosure, the base assembly 10B may not only effectively reduce the size of the TOF depth information camera module in the horizontal direction, but also improve the high space utilization of the TOF depth information camera module to comprehensively optimize the body size of the TOF depth information camera module.

In addition, it is worth mentioning that since the projection assembly 20B has a modular structure, the relative positional relationship between the components in the projection assembly 20B is determined in advance before participating in assembly, so that after the projection assembly 20B is installed on the carrying portion 122B of the base body 12B, the cooperative relationship between the components in the projection assembly 20B remains unchanged. In other words, the projection assembly 20B in the modular structure facilitates ensuring the cooperation accuracy between the various components in the projection assembly 20B. At the same time, since the projection assembly 20B has the modular structure, when the projection assembly 20B is damaged or fails, repairs may be made by replacement. Therefore, the maintenance and repair of the depth information camera module is relatively convenient.

Further, as shown in FIG. 11, in the embodiment of the present disclosure, the base body 12B is implemented as an integral base that is integrally molded on the circuit board 11B such that the base body 12B and the circuit board 11B have an integral structure. It may be easily understood that the structural strength of the circuit board 11B may be effectively enhanced by the base body 12B integrally coupled to the circuit board 11B to effectively prevent the circuit board 11B from being bent or deformed.

In particular, in the embodiment of the present disclosure, the base body 12B is integrally molded at a corresponding position of the circuit board 11B by a molding process, and covers a portion of the circuit board 11B and the at least one electronic component 111B. It should be understood by those skilled in the art that since the at least one electronic component 111B located on the circuit board 11B is embedded by the base body 12B, each of the at least one electronic component 111B is effectively isolated by the base body 12B. In this way, electromagnetic interference of each of the at least one electronic component 111B during operation is effectively avoided. It is worth mentioning that in the embodiment of the present disclosure, the photosensitive element 31B of the receiving assembly 30B is mounted and electrically connected to the circuit board 11B, and therefore, in the process of implementing the molding process to form the base body 12B, the photosensitive element 31B of the receiving assembly 30B should be prevented from being contaminated.

Figure 13:
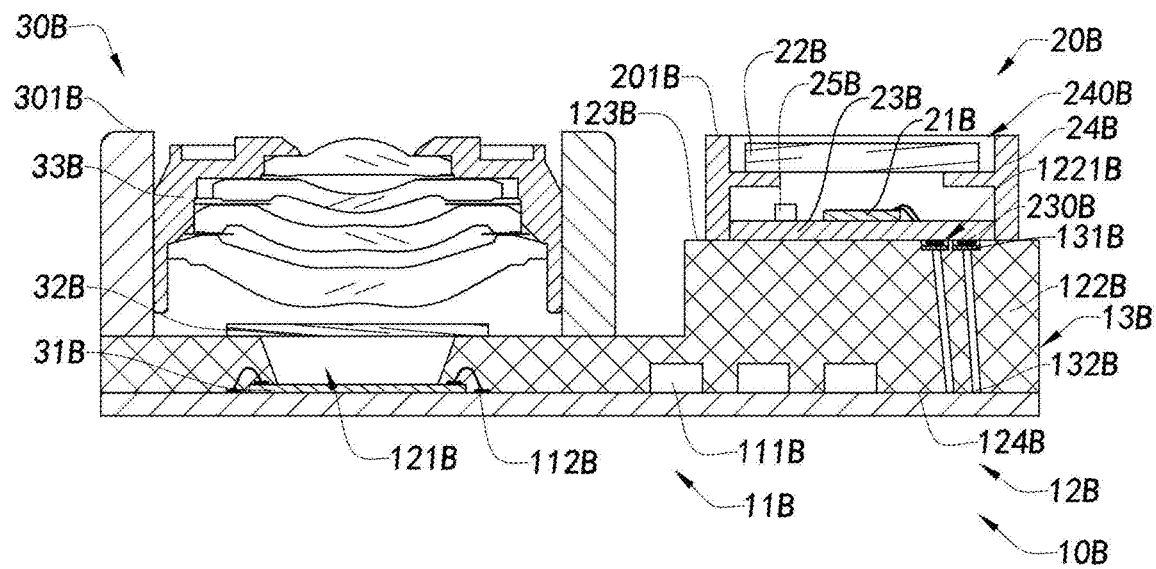
FIG. 13 is a cross-sectional schematic diagram of a modified embodiment of the TOF depth information camera module according to the embodiment.

FIG. 13 is a modified embodiment of the embodiment according to the present disclosure, in the modified embodiment, the photosensitive element 31B is electrically connected to the circuit board 11B by a set of leads 112B, where the base body 12B is integrally molded at a corresponding position of the circuit board 11B by a molding process, and integrally covers a portion of the circuit board 11B, the at least one electronic component 111B, at least a portion of the non-photosensitive area of the photosensitive element 31B and the leads 112B. In this way, it is effectively prevented that the leads 112B for electrically connecting the photosensitive element 31B and the circuit board 11B are loosened in the subsequent use of the TOF depth information camera module, resulting in electrical connection failure. That is, in the modified embodiment of the present disclosure, the base body 12B further integrally covers at least a portion of the leads 112B, effectively reinforcing the stability of the electrical connection between the photosensitive element 31B and the circuit board 11B.

As described above, in the embodiment of the present disclosure, the projection assembly 20B is mounted on the carrying portion 122B on the top side of the base body 12B. Here, in the present disclosure, the carrying portion 122B refers to an area in the top side surface of the base body 12B to support the projection assembly 20B. In particular, in the embodiment of the present disclosure, the carrying portion 122B of the base body 12B is flush with the top side surface of the base body 12B.

It should be observed that the technical solution of mounting the projection assembly 20B to the carrying portion 122B of the base body 12B may directly improve the mounting height of the projection assembly 20B, as compared to the existing technical solution in which the projection assembly 20B is directly mounted on the circuit board 11B. As described above, generally, the overall size of the projection assembly 20B is less than the overall size of the receiving assembly 30B. In the embodiment of the present disclosure, the size difference (height size difference) between the projection assembly 20B and the receiving assembly 30B may be compensated by the height size of the base body 12B to change the relative positional relationship between the projection assembly 20B and the receiving assembly 30B.

More specifically, for example, the existing projection assembly and receiving assembly have an overall height of h1 and h2, respectively, that is, when the projection assembly and the receiving assembly are selected to be mounted on the same circuit board according to the mounting method of the existing TOF depth information camera module, there is a height difference h2−h1 between the projection assembly and the receiving assembly. Accordingly, in the embodiment of the present disclosure, the height difference between the projection assembly 20B and the receiving assembly 30B may be adjusted by the base body 12B. Here, the height size of the base assembly 12B is set to h3. It may be understood that in the embodiment of the present disclosure, the projection assembly 20B is mounted on the carrying portion 122B of the base body 12B (here, the carrying portion 122B is flush with the top side surface of the base body 12B), so that the mounting height of the projection assembly 20B relative to the circuit board 11B is h3+h1. That is, the mounting height of the projection assembly 20B relative to the circuit board 11B may be raised by the base body 12B. In particular, when the mounting height of the base body 12B is h3=h2−h1, the mounting height of the projection assembly 20B relative to the circuit board 11B is consistent with the mounting height of the receiving assembly 30B relative to the circuit board 11B, that is, the TOF depth information camera module has a flat top surface to facilitate assembly of the TOF depth information camera module to the mobile terminal.

In order to facilitate assembly of the TOF depth information camera module to the mobile terminal device, the TOF depth information camera module preferably has a relatively flat top surface, i.e., a top surface 201B of the projection assembly 20B is relatively flush with a top surface 301B of the receiving assembly 30B. In conjunction with the above description, it may be appreciated that in the embodiment of the present disclosure, the relative positional relationship of the top surface 201B of the projection assembly 20B relative to the top surface 301B of the receiving assembly 30B may be changed by adjusting the overall height size of the base body 12B, and finally the top surface 201B of the projection assembly 20B is brought into flush with the top surface 301B of the receiving assembly 30B.

Further, since the projection assembly 20B is mounted on the carrying portion 122B of the base body 12B instead of directly contacting the circuit board 11B, a new connection circuit needs to be established for the projection assembly 20B and the circuit board 11B, such that when the projection assembly 20B is mounted on the top side 123B of the base body 12B, it is still possible to provide the projection assembly 20B with energy required for operation by the circuit board 11B.

As described above, in the embodiment of the present disclosure, the projection assembly 20B is an integral projection assembly having an integral modular structure. Accordingly, when the projection assembly 20B is mounted to the carrying portion 122B of the base body 12B, the projection assembly circuit board 23B of the projection assembly 20B is overlapped with the carrying portion 122B. In particular, in the embodiment of the present disclosure, the projection assembly 20B is configured by back conduction method. Here, "back conduction" refers to that electrical connection terminals of the components (including the projection unit 21B, the detecting element 25B, etc.,) mounted on the front side of the projection assembly circuit board 23B are disposed on the back side of the projection assembly circuit board. In other words, in the embodiment of the present disclosure, the projection assembly 20B has a series of conductive terminals 230B for conducting the projection unit 21B and the detecting element 25B, etc. of the projection assembly 20B.

As shown in FIG. 11, in the embodiment of the present disclosure, the base assembly 10B further includes a conductive element 13B, where the conductive element 13B extends between the projection assembly 20B and the circuit board 11B to establish a connection circuit between the projection assembly 20B and the circuit board 11B.

In particular, in the embodiment of the present disclosure, the conductive element 13B is integrally molded with the base body 12B and embedded in the base body 12B, where the conductive element 13B has a first electrical connection terminal 131B and a second electrical connection terminal 132B. As shown in FIG. 11, the first electrical connection terminal 131B of the conductive element 13B is exposed on the top side 123B of the base body, more specifically, exposed on the carrying portion 122B of the top side 123B of the base body, and the second electrical connection terminal 132B of the conductive element 13B is electrically connected to the connection pad of the circuit board 11B. Correspondingly, when the projection assembly 20B is mounted on the carrying portion 122B of the base body 12B, the conductive terminals 230B located on the back side of the projection assembly circuit board 23B are overlapped with the carrying portion 122B of the base body 12B, such that the conductive terminals 230B located on the back side of the projection assembly circuit board 23B respectively correspond and are electrically connected to the first electrical connection terminals 131B of the conductive elements 13B. Here, the projection assembly 20B is connected to the conductive elements 13B, and the conductive elements 13B are electrically connected to the circuit board 11B, thereby establishing the connection circuit between the projection assembly 20B and the circuit board 11B by the conductive elements 13B.

In a specific implementation, a conductive medium (for example, a conductive silver adhesive) is applied between the conductive terminal 230B of the projection assembly circuit board 23B and the first electrical connection terminal 131B of the conductive element 13B, so that a stable electrical connection is established between the projection assembly 20B and the conductive element 13B. However, generally, the conductive medium has fluidity, and inevitably, during the application of the conductive medium, the overflow of the conductive medium causes a fault such as short circuit of the projection assembly 20B. Here, it is worth mentioning that the conductive medium is applied between the conductive terminal 230B of the projection assembly and the first electrical connection terminal 131B of the conductive element 13B, which can not only electrically connect the two, but also make it possible to fix both by the conductive medium. In other words, the conductive medium has a certain adhesiveness, for example, the conductive medium may be implemented as a conductive medium having a bonding property such as a conductive silver adhesive.

Accordingly, for the above technical problem, in the embodiment of the present disclosure, the base body 12B is further provided with at least one anti-overflow groove 1221B, where the at least one anti-overflow groove 1221B is respectively disposed on the electrical connection between the projection assembly 20B and the conductive element 13B, for preventing the conductive medium from overflowing to cause the projection assembly 20B to be short-circuited. More specifically, as shown in FIG. 11, in the embodiment of the present disclosure, the at least one anti-overflow groove 1221B is concavely formed on the carrying portion 122B of the base body 12B, where the first electrical connection terminal 131B of the conductive element 13B is exposed to the at least one anti-overflow groove 1221B. Correspondingly, when the projection assembly 20B is mounted on the carrying portion 122B of the base body 12B, the conductive terminals 230B of the projection assembly 20B are respectively corresponding to and embedded in the at least one anti-overflow groove 1221B to be in contact with the first electrical connection terminals 131B of the conductive elements 13B. Here, the at least one anti-overflow groove 1221B is provided with a conductive medium.

When the projection assembly 20B is mounted on the carrying portion 122B of the base body 12B, the at least one anti-overflow groove 1221B is sealed by the projection assembly circuit board 23B to prevent the conductive adhesive from overflowing to cause a short circuit or the like.

It is worth mentioning that, when the projection assembly 20B is mounted on the base body, the at least one anti-overflow groove 1221B may be regarded as an alignment reference for the projection assembly 20B, which facilitates the positional mounting of the projection assembly 20B on the carrying portion 122B of the base body 12B.

It is also worth mentioning that in the embodiment of the present disclosure, the conductive element 13B may be implemented as a conductive post (e.g., a copper post) or a wire (e.g., a copper wire), etc., which may be preset at a corresponding position of the circuit board 11B before the molding process is performed to form the base body 12B, to form a pre-embedded connection circuit between the projection assembly 20B and the circuit board 11B after the base body 12B is molded. That is, in the embodiment of the present disclosure, the connection circuit between the projection assembly 20B and the circuit board 11B is formed inside the base body 12B by the conductive element 13B in a pre-embedded method. Here, it should be appreciated that since the conductive elements 13B are embedded in the base body, each conductive element 13B is effectively physically isolated by the base body 12B. In this way, not only circuit failure such as short circuit between the conductive elements 13B may be effectively avoided, but also the conductive elements 13B may be prevented from being oxidized and consumed to improve the service life of the conductive elements 13B.

Of course, in a further embodiment of the present disclosure, the conductive element 13B may be formed at the corresponding position on the base body 12B in other methods. For example, a molding process may be first performed to form the base body 12B, and further, at least one through-hole is formed in the base body 12B for mounting the conductive element 13B therein, where the through-hole is disposed through the base body 12B and in this way, the conductive element 13B is disposed at a corresponding position on the base body 12B. In addition, a connection circuit may be formed on the surface of the base body 12B by LDS (Laser-Direct-structuring) for electrically connecting the projection assembly 20B to the circuit board 11B.

Figure 14:
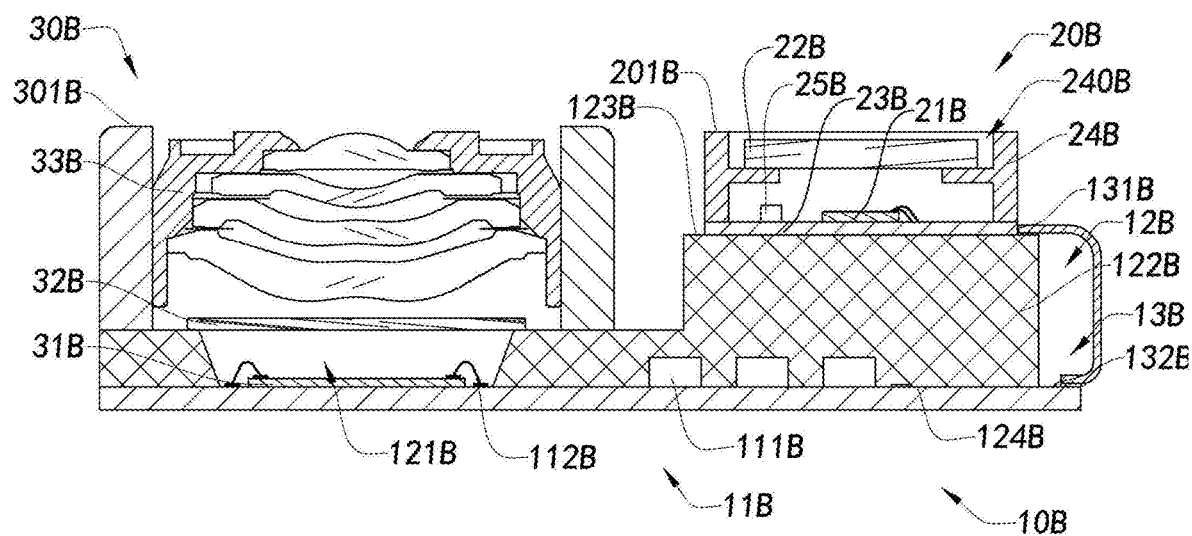
FIG. 14 is a cross-sectional schematic diagram of another modified embodiment of the TOF depth information camera module according to the embodiment, showing that the conductive element is implemented as a flexible board.

Another modified embodiment of the embodiment according to the present disclosure is shown in FIG. 14, in the modified embodiment, the conductive element 13B is implemented as a flexible board. The flexible board extends folded between the projection assembly 20B and the circuit board 11B such that one end of the flexible board (the first electrical connection terminal 131) is electrically connected to the projection assembly circuit board 23B, and the other end of the flexible board (the second electrical connection terminal 132B) is electrically connected to the circuit board 11B, and in this way, the connection circuit between the projection assembly 20B and the circuit board 11B is established.

Figure 15:
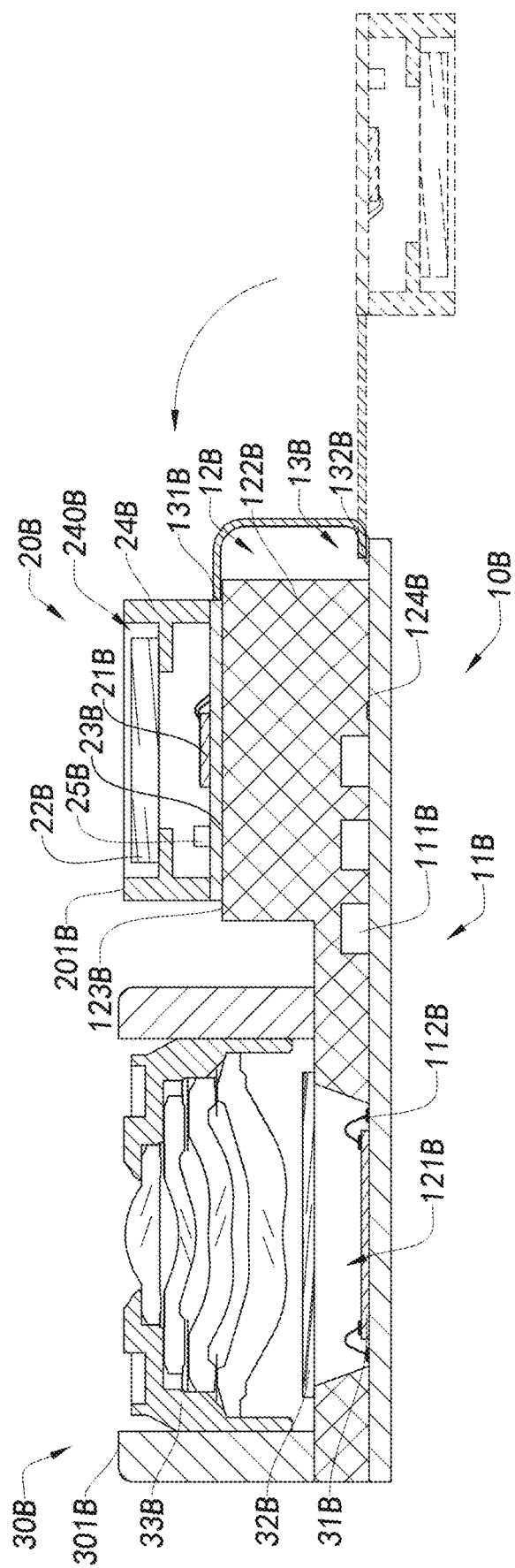
FIG. 15 is a schematic diagram showing the mounting of the projection assembly when the conductive element is implemented as a flexible board.

Here, when the conductive element 13B is implemented as a flexible board, the flexible board extends folded outside of the base body 12B instead of within the base body 12B. In other words, the conductive element 13B and the base body 12B are separate components. In a specific implementation, the flexible board may be disposed to have an integral structure with the circuit board 11B and the projection assembly circuit board 23B. That is, the flexible board integrally extends between the projection assembly circuit board 23B and the circuit board 11B to form a circuit board assembly. Thus, after the base body 12B is protruding at a corresponding position of the circuit board 11B, the flexible board may be folded until the projection assembly circuit board 23B is overlapped with the carrying portion 122B at the top side of the base body 12B, as shown in FIG. 15. Of course, in another embodiment, the flexible board may be implemented as a separate component. Correspondingly, after the base body 12B is protruding at the corresponding position of the circuit board 11B, the two ends of the flexible board are electrically connected (for example, by welding) to the projection assembly circuit board 23B and the circuit board 11B, to conduct the projection assembly 20B and the circuit board 11B by the flexible board.

As described above, since the projection assembly 20B is mounted on the top side of the base body 12B and electrically connected to the circuit board 11B through the conductive element 13B, electronic components originally mounted on the projection assembly circuit board 23B can be transferred and mounted to the circuit board 11B. In other words, the size (length and width sizes) of the projection assembly circuit board 23B can be reduced. For example, the projection assembly 20 includes electronic components such as an IC controller, a resistor, a capacitor, or the like, where some of the electronic components have a larger size. In other words, since the electronic components of the projection assembly 20 can be transferred and mounted to the circuit board 11B compared to the existing projection assembly, the projection assembly circuit board 23B of the projection assembly 20 can be reduced.

It is worth mentioning that the projection assembly circuit board 23B and the circuit board 11B are electrically connected by the conductive element 13B (flexible board), so that the projection unit 21B of the projection assembly 20B can be conducted to other electronic components (for example, IC controller or the like) of the projection assembly 20B that are transferred to the circuit board 11B by the conductive element 13B, so that the projection assembly 20B may work normally.

Figure 16:
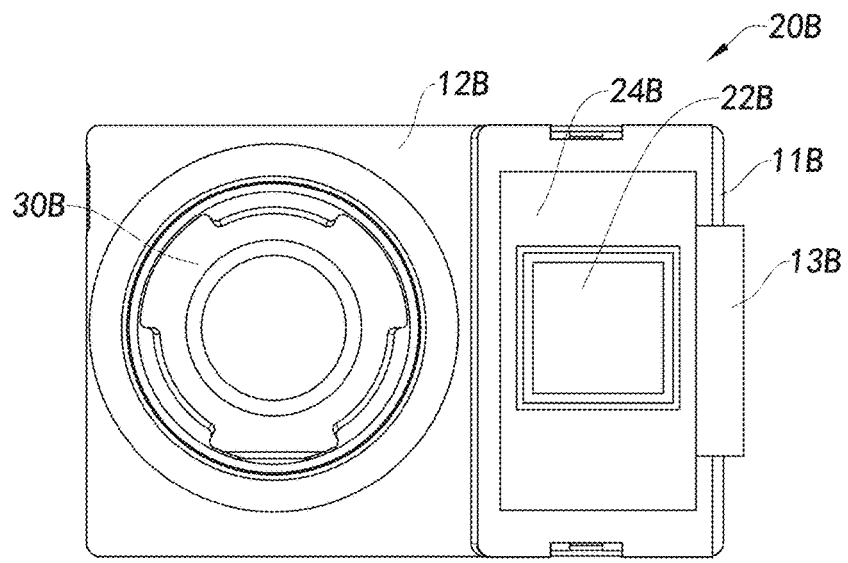
FIG. 16 is a schematic top plan view of the TOF depth information camera module according to the embodiment.

Here, since the projection assembly circuit board 23B is mounted on the carrying portion 122B of the base body 12B, the area of the carrying portion 122B may be reduced, so that the depth information camera module has a relatively small length and width size. Preferably, as shown in FIG. 16, the carrying portion 122B of the base body 12B is configured such that: (from a top view) the projection of the carrying portion 122B of the base body 12B on the circuit board 11B is located in the area of the circuit board 11B. In other words, the projection of the projection assembly circuit board 23B on the circuit board 11B is located in the area of the circuit board 11B, and the size of the projection assembly circuit board 23B is smaller than the size of the circuit board 11B. Here, the projection of the projection assembly circuit board 23B on the circuit board 11B may be completely located in the area of the circuit board 11B or partially located in the area of the circuit board 11B. That is, the projection of the projection assembly circuit board 23B on the circuit board 11B is at least partially located in the area of the circuit board 11B.

It is worth mentioning that the projection assembly circuit board 23B and the circuit board 11B are located at different heights of the base body 12B. Therefore, the height difference between the projection assembly circuit board 23B and the circuit board 11B may be adjusted by the base body 12B to control the upper end surfaces of the projection assembly 20B and the receiving assembly 30B to be flush or reduce the height difference between the two, to be more suitable for application to a mobile terminal.

Figure 17:
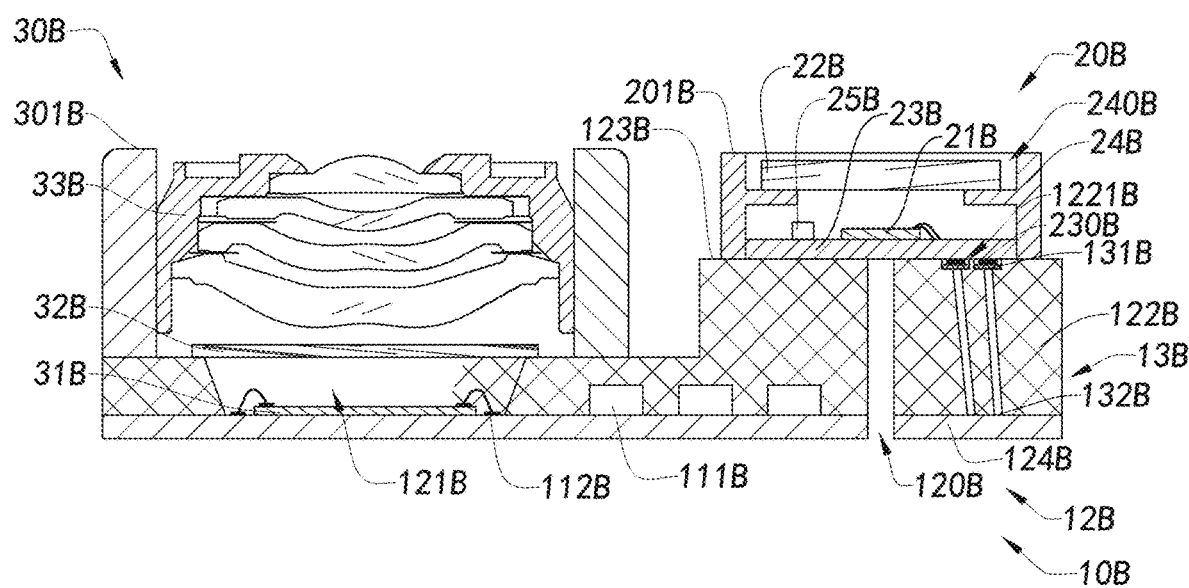
FIG. 17 is a cross-sectional schematic diagram of another modified embodiment of the TOF depth information camera module according to the embodiment.

Further, since the projection assembly 20B is mounted on the carrying portion 122B of the base body 12B, it is inevitable that the heat generated by the projection unit 21B of the projection assembly 20B may be accumulated on the carrying portion 122B, affecting the performance of the projection assembly 20B. Therefore, in order to enhance the heat dissipation function of the projection assembly 20B, as shown in FIG. 17, in a modified embodiment of the embodiment of the present disclosure, the base assembly 10B further has a heat conductive through-hole 120B. The heat conductive through-hole 120B penetrates through the base body 12B and the circuit board 11B, so that the heat generated by the projection assembly 20B can be transmitted to the outside by the heat conductive through-hole 120B. Preferably, the heat conductive through-hole 120B may be filled with an element that enhances heat dissipation, such as metal particles, grits, to further enhance the heat dissipation performance of the projection assembly 20B. It is worth mentioning that, in order to further enhance the heat dissipation effect of the projection assembly 20B, in particular, the projection assembly circuit board 23B of the projection assembly 20B may be implemented as a ceramic substrate. Those skilled in the art should understand that the ceramic substrate has relatively superior thermal conductivity and relatively superior flatness compared to other types of circuit boards, such as PCB boards, and FCB boards.

It is worth mentioning that, by the conductive element 13B changing the circuit connection of the projection assembly 20B, the mounting position of each component of the projection assembly 20B is relatively more freely designed, and the projection assembly 20B can be designed as an integral structure and supported by a circuitry mounted on the top side 123B of the base body 12B.

Here, some electronic components of the projection assembly 20B may be optionally mounted on the circuit board 11B. For example, an electronic component originally mounted on the projection assembly circuit board 23B of the projection assembly 20B is mounted on the circuit board 11B, and the conductive element 13B cooperates with other components of the projection assembly 20B. In this way, the structure of the projection assembly 20B mounted on the base body 12B may be simplified, which facilitates the modular design of the projection assembly 20B.

Figure 18:
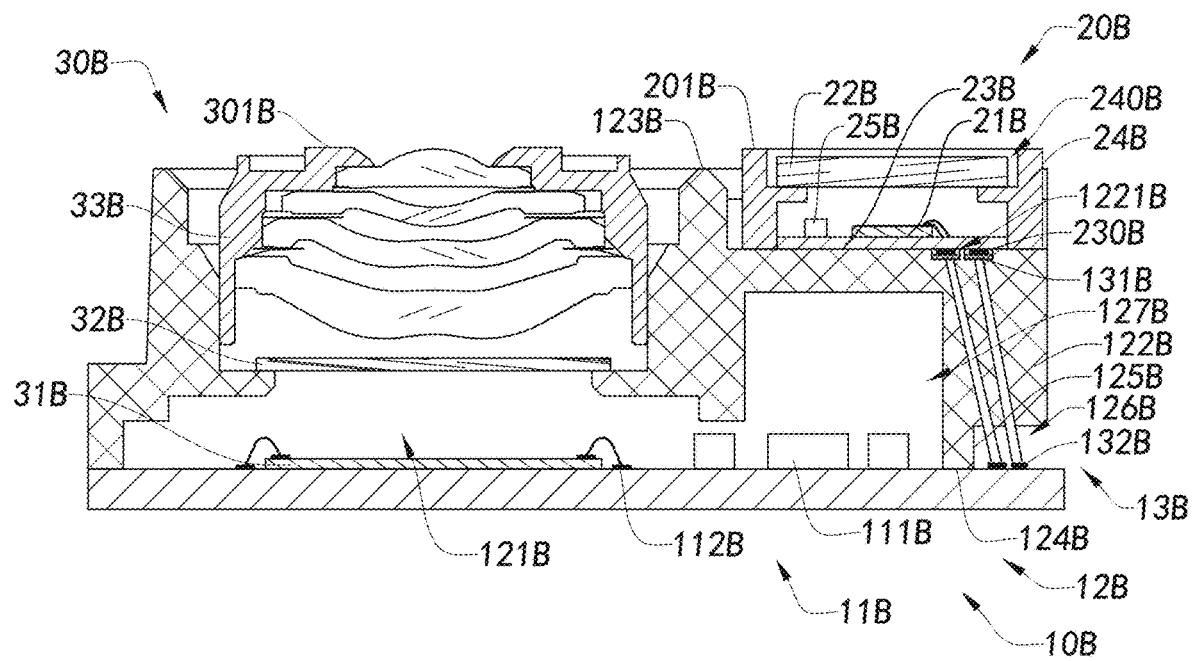
FIG. 18 is a cross-sectional schematic diagram of another modified embodiment of the TOF depth information camera module according to the embodiment.

FIG. 18 is a modified embodiment of the embodiment according to the present disclosure, in the modified embodiment, the base body 12B is implemented as a split base that is separately molded by a related process (e.g., an injection molding process), and mounted at a corresponding position of the circuit board 11B for mounting the projection assembly 20B and the receiving assembly 30B.

More specifically, as shown in FIG. 18, in the modified embodiment, the base body 12B has a hollow structure to define and form a receiving cavity 127B. When the base body 12B is mounted on the circuit board 11B, the at least one electronic component 111B mounted on the circuit board 11B is housed in the receiving cavity 127B of the base body 12B, and the space utilization of the TOF camera module is improved in this way. Here, since the base body 12B has the receiving cavity 127B, when the base body 12B is mounted on the circuit board 11B, unnecessary touch between the base body 12B and the at least one electronic component 111B provided on the circuit board 11B may be effectively avoided.

Similarly, in the modified embodiment, the base body 12B has a carrying portion 122B at the top side of the base body for mounting the projection assembly thereon. Here, the carrying portion 122B refers to an area in the top side surface of the base body 12B to support the projection assembly 20B. In particular, in the embodiment of the present disclosure, the carrying portion 122B of the base body 12B is flush with the top side surface of the base body 12B, that is, the carrying portion 122B and the top side surface of the base body 12B are in the same plane.

Correspondingly, when the projection assembly 20B is mounted on the carrying portion 122B of the base body 12B, the mounting reference height of the projection assembly 20B is lifted by the base body 12B, compared to the existing technical solution in which the projection assembly is directly mounted on the circuit board. As described above, generally, the overall size of the projection assembly 20B is less than the overall size of the receiving assembly 30B. Therefore, in the embodiment of the present disclosure, the size difference (height size difference) between the projection assembly 20B and the receiving assembly 30B may be adjusted by the height size of the base body 12B, to change the relative positional relationship of the projection assembly 20B and the receiving assembly 30B.

Further, since the projection assembly 20B is mounted on the carrying portion 122B of the base body 12B instead of directly contacting the circuit board 11B, a new connection circuit needs to be established for the projection assembly 20B and the circuit board 11B, such that when the projection assembly 20B is mounted on the top side 123B of the base body 12B, it is still possible to provide the projection assembly 20B with energy required for operation by the circuit board 11B.

As described above, in the present disclosure, the projection assembly 20B is an integral projection assembly having an integral modular structure. Accordingly, when the projection assembly 20B is mounted to the carrying portion 122B of the base body 12B, the projection assembly circuit board 23B of the projection assembly 20B is overlapped with the carrying portion 122B. In particular, in the embodiment of the present disclosure, the projection assembly 20B is configured in a back conduction method. Here, "back conduction" refers to that electrical connection terminals of the components (including the projection unit 21B, the detecting element 25B, etc.,) mounted on the front side of the projection assembly circuit board 23B are disposed on the back side of the projection assembly circuit board 23B. In other words, in the embodiment of the present disclosure, the projection assembly 20B has a series of conductive terminals 230B for conducting the projection unit 21B and the detecting element 25B, etc. of the projection assembly 20B.

Accordingly, in the modified embodiment of the present disclosure, the connection circuit between the projection assembly 20B and the circuit board 11B is established by a conductive element 13B of the base assembly 10B. As shown in FIG. 18, in the modified embodiment of the present disclosure, the conductive element 13B is integrally molded in the base body 12B and extends longitudinally within the base body 12B to electrically connect the projection assembly 20B to the circuit board 11B. As shown in FIG. 18, the conductive element 13B extends longitudinally in the base body 12B, and has a first electrical connection terminal 131B and a second electrical connection terminal 132B, where the first electrical connection terminal 131B is exposed on the top side 123B of the base body 12B, more specifically, exposed to the carrying portion 122B on the top side of the base body, and is electrically connected to the projection assembly 20B, and the second electrical connection terminal 132B is exposed to a bottom side 124B of the base body 12B.

Correspondingly, when the base body 12B is mounted on the circuit board 11B, the bottom side 124B of the base body 12B is in contact with the circuit board 11B, so that the second electrical connection terminal 132B exposed to the bottom side 124B of the base body 12B corresponds to the connection pad of the circuit board 11B. Thereby, the second electrical connection terminal 132B of the conductive element 13B may be electrically connected to the circuit board 11B by welding or applying a conductive medium (for example, a conductive silver adhesive). Correspondingly, when the projection assembly 20B is mounted on the carrying portion 122B of the base body 12B, the conductive terminals 230B located on the back side of the projection assembly circuit board 23B are overlapped with the carrying portion 122B of the base body 12B, such that the conductive terminals 230B located on the back side of the projection assembly circuit board 23B respectively correspond and are electrically connected to the first electrical connection terminals 131B of the conductive elements 13B. Here, the projection assembly 20B is connected to the conductive element 13B, and the conductive element 13B is electrically connected to the circuit board 11B, thereby establishing the connection circuit between the projection assembly 20B and the circuit board 11B by the conductive element 13B.

In a specific implementation, a conductive medium (for example, a conductive silver adhesive) needs to be applied between the conductive terminal 230B of the projection assembly circuit board 23B and the first electrical connection terminal 131B of the conductive element 13B, so that a stable electrical connection is established between the projection assembly 20B and the conductive element 13B. However, generally, the conductive medium has fluidity, and inevitably, during the application of the conductive medium, the overflow of the conductive medium causes a fault such as short circuit of the projection assembly 20B.

Accordingly, for the above technical problem, in the embodiment of the present disclosure, the base body 12B is further provided with at least one anti-overflow groove 1221B, where the at least one anti-overflow groove 1221B is respectively disposed on the electrical connection between the projection assembly 20B and the conductive element 13B, for preventing the conductive medium from overflowing to cause the projection assembly 20B to be short-circuited. For example, the conductive medium is implemented as a conductive silver adhesive. More specifically, as shown in FIG. 18, in the embodiment of the present disclosure, the at least one anti-overflow groove 1221B is concavely formed on the carrying portion 122B of the base body 12B, where the first electrical connection terminal 131B of the conductive element 13B is exposed to the at least one anti-overflow groove 1221B. Correspondingly, when the projection assembly 20B is mounted on the carrying portion 122B of the base body 12B, the conductive terminals 230B of the projection assembly 20B are respectively corresponding to and embedded in the at least one anti-overflow groove 1221B to be in contact with the first electrical connection terminal 131B of the conductive element 13B. Here, the at least one anti-overflow groove 1221B is provided with a conductive silver adhesive, when the projection assembly 20B is mounted on the carrying portion 122B of the base body 12B, the anti-overflow groove 1221B is sealed by the projection assembly circuit board 23B to prevent the conductive adhesive from overflowing to cause a short circuit or the like. It is worth mentioning that, when the projection assembly 20B is mounted on the base body 12B, the at least one anti-overflow groove 1221B may be regarded as an alignment reference for the projection assembly 20B, which facilitates the positional mounting of the projection assembly 20B on the carrying portion 122B of the base body 12B.

In addition, in order to facilitate the welding process or the application of the conductive medium between the second electrical connection terminal 132B of the conductive element 13B and the circuit board 11B, as shown in FIG. 18, in the modified embodiment of the present disclosure, the base body 12B has a recessed portion 125B after molding, and the recessed portion 125B is concavely formed on the bottom side 124B of the base body 12B, where the second electrical connection terminal 132B of the conductive element 13B is exposed and partially protruded from the recessed portion 125B. Therefore, when the base body 12B is mounted on the circuit board 11B, the bottom side 124B of the base body 12B is partially overlapped with the circuit board 11B, and at the same time, the second electrical connection terminal 132B of the conductive element 13B partially protruding from the recessed portion 125B corresponds to the connection pad of the circuit board 11B. It should be appreciated that the recessed portion 125B is not overlapped with the circuit board 11B to define an electrical connection space 126B between the circuit board 11B and the recessed portion 125B to facilitate the welding process or the application of the conductive medium by an operator or a welding machine.

Preferably, in the embodiment of the present disclosure, the recessed portion 125B corresponds to an edge area of the circuit board 11B, that is, when the base body 12B is mounted on the circuit board 11B, the electrical connection space 126B defined by the recessed portion 125B and the circuit board 11B is located at the edge area of the circuit board 11B, so that an operator or a welding machine may easily find an operable orientation to perform a welding process or apply a conductive medium.

It is worth mentioning that in the embodiment of the present disclosure, the conductive element 13B may be implemented as a conductive post (e.g., a copper post) or a wire (e.g., a copper wire), etc., which may be preset in a molding die forming the base body 12B in performing an injection molding process to form the base body 12B, so that the conductive element 13B is formed at a corresponding position of the base body 12B after the base body 12B is integrally molded. That is, in the embodiment of the present disclosure, the connection circuit between the projection assembly 20B and the circuit board 11B is formed inside the base body 12B by the conductive element 13B in a pre-embedded method. Here, it should be appreciated that since the conductive elements 13B are embedded in the base body, each conductive element 13B is effectively physically isolated by the base body 12B. In this way, not only circuit failure such as short circuit between the conductive elements 13B may be effectively avoided, but also the conductive elements 13B may be prevented from being oxidized and consumed to improve the service life of the conductive elements 13B.

Figure 19:
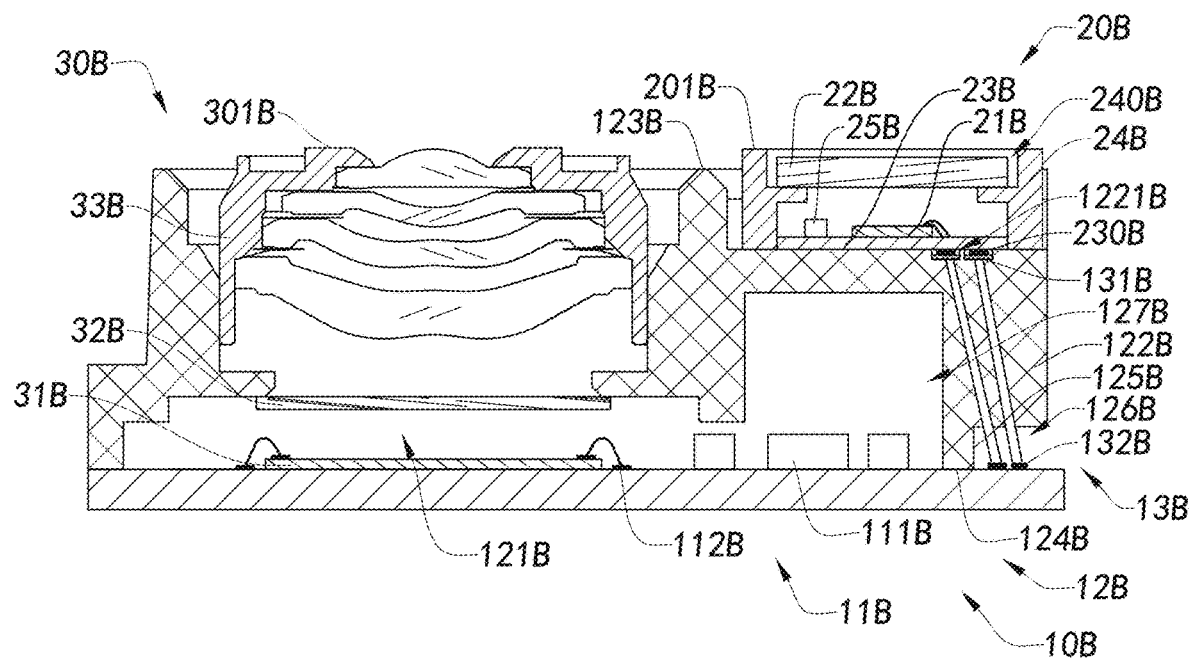
FIG. 19 is a cross-sectional schematic diagram of another modified embodiment of the TOF depth information camera module according to the embodiment.

FIG. 19 is a further modified embodiment of the embodiment of the present disclosure. As shown in FIG. 19, the optical lens assembly 33B is mounted on the base body 12B. For example, the optical lens assembly 33B is mechanically coupled, threaded connect, or the like, to the inner side wall of the base body 12B, so that the optical lens assembly 33B is held in the photosensitive path of the photosensitive element 31B. Here, the optical filtering element 32B can be held below the optical lens assembly 33B in such an approach as to be attached to the inner side wall of the base body 12B, so that the optical filtering element 32B is held in the photosensitive path of the photosensitive element 31B. Of course, the optical filtering element 32B can also be attached to the inner wall of the lens barrel of the optical lens assembly 33B so that it is held in the photosensitive path of the photosensitive element 31B. This is not limited by the present disclosure.

Figure 20:
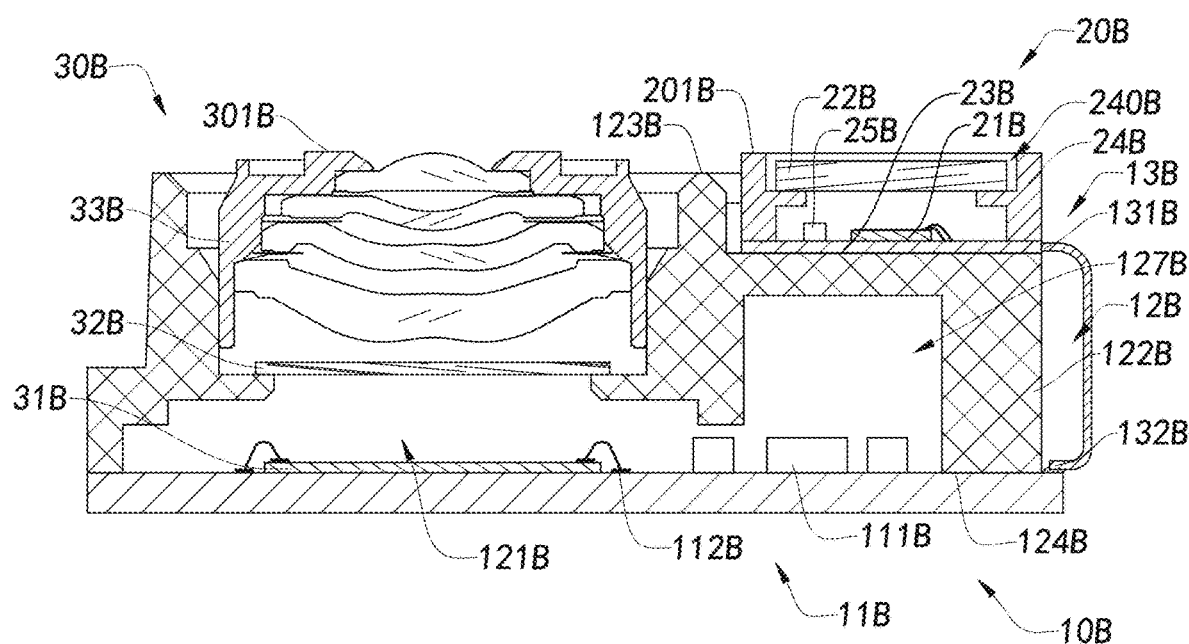
FIG. 20 is a cross-sectional schematic diagram of another modified embodiment of the TOF depth information camera module according to the embodiment.

Another modified embodiment of the embodiment according to the present disclosure is shown in FIG. 20, in the modified embodiment, the conductive element 13B is implemented as a flexible board. The flexible board extends folded between the projection assembly 20B and the circuit board 11B such that one end of the flexible board (the first electrical connection terminal 131B) is electrically connected to the projection assembly circuit board 23B, and the other end of the flexible board (the second electrical connection terminal 132B) is electrically connected to the circuit board 11B, and in this way, the connection circuit between the projection assembly 20B and the circuit board 11B is established.

Here, when the conductive element 13B is implemented as a flexible board, the flexible board extends folded outside of the base body 12B instead of within the base body 12B. In other words, the flexible board and the base body 12B are separate components. In a specific implementation, the flexible board may be disposed to have an integral structure with the circuit board 11B and the projection assembly circuit board 23B. That is, the flexible board integrally extends between the projection assembly circuit board 23B and the circuit board 11B to form a circuit board assembly. Thus, after the base body 12B is mounted to a corresponding position of the circuit board, the flexible board may be folded until the projection assembly circuit board 23B is overlapped with the carrying portion 122B at the top side of the base body 12B. Of course, in another implementation, the flexible board may be implemented as a separate component. Correspondingly, after the base body 12B is mounted to the corresponding position of the circuit board 11B, the two ends of the flexible board are electrically connected to the projection assembly circuit board 23B and the circuit board 11B, respectively, to conduct the projection assembly 20B and the circuit board 11B by the flexible board. In addition, since the base body 12B and the flexible board are separate components, in the specific implementation, the base body 12B may also be implemented as a conventional bracket for the purpose of providing a support platform for supporting the projection assembly 20B thereon.

As described above, since the projection assembly 20B is mounted on the top side of the base body 12B and electrically connected to the circuit board 11B through the conductive element 13B, electronic components (e.g., resistors, capacitors, controllers, etc.) originally mounted on the projection assembly circuit board 23B can be transferred and mounted to the circuit board 11B. In other words, the size (length and width sizes) of the projection assembly circuit board 23B can be reduced. Here, since the projection assembly circuit board 23B is mounted on the carrying portion 122B of the base body 12B, the area of the carrying portion 122B may be reduced, so that the depth information camera module has a relatively small length and width sizes. Preferably, the carrying portion 122B of the base body 12B is configured such that: (from a top view) the projection of the carrying portion 122B of the base body 12B on the circuit board 11B is located in the area of the circuit board 11B. In other words, the projection of the projection assembly circuit board 23B on the circuit board 11B is at least partially located in the area of the circuit board 11B.

It is worth mentioning that in the present disclosure, the projection assembly 20B is fixed to the carrying portion 122B of the base body 12B by gluing or welding. When the external impact is large, the projection assembly 20B may be offset from the carrying portion 122B. Therefore, in another embodiment of the present disclosure, the base body 12B may further form a limiting mechanism for preventing an unnecessary offset of the projection assembly 20B mounted on the carrying portion 122B. For example, in an embodiment of the present disclosure, the base body 12B further has a surrounding wall that extends protruded from the top side of the base body 12B and surrounds the carrying portion 122B. Here, the surrounding wall has a height to define and form a placement cavity in cooperation with the carrying portion 122B for accommodating the projection assembly 20B in a limited space. Here, when the conductive element 13B is implemented as a flexible board, in order to mount the flexible board, the surrounding wall may be hollowly arranged at the flexible board to allow the flexible board to pass through the hollow hole into the placement cavity. Of course, the flexible board may be mounted in the surrounding wall by other means, for example, reducing the height of one side of the surrounding wall, or the like. In this regard, the shape or size of the surrounding wall can be adjusted based on the shape and size and mounting requirements of the projection assembly 20B, and is not limited by the present disclosure.

Figure 21:
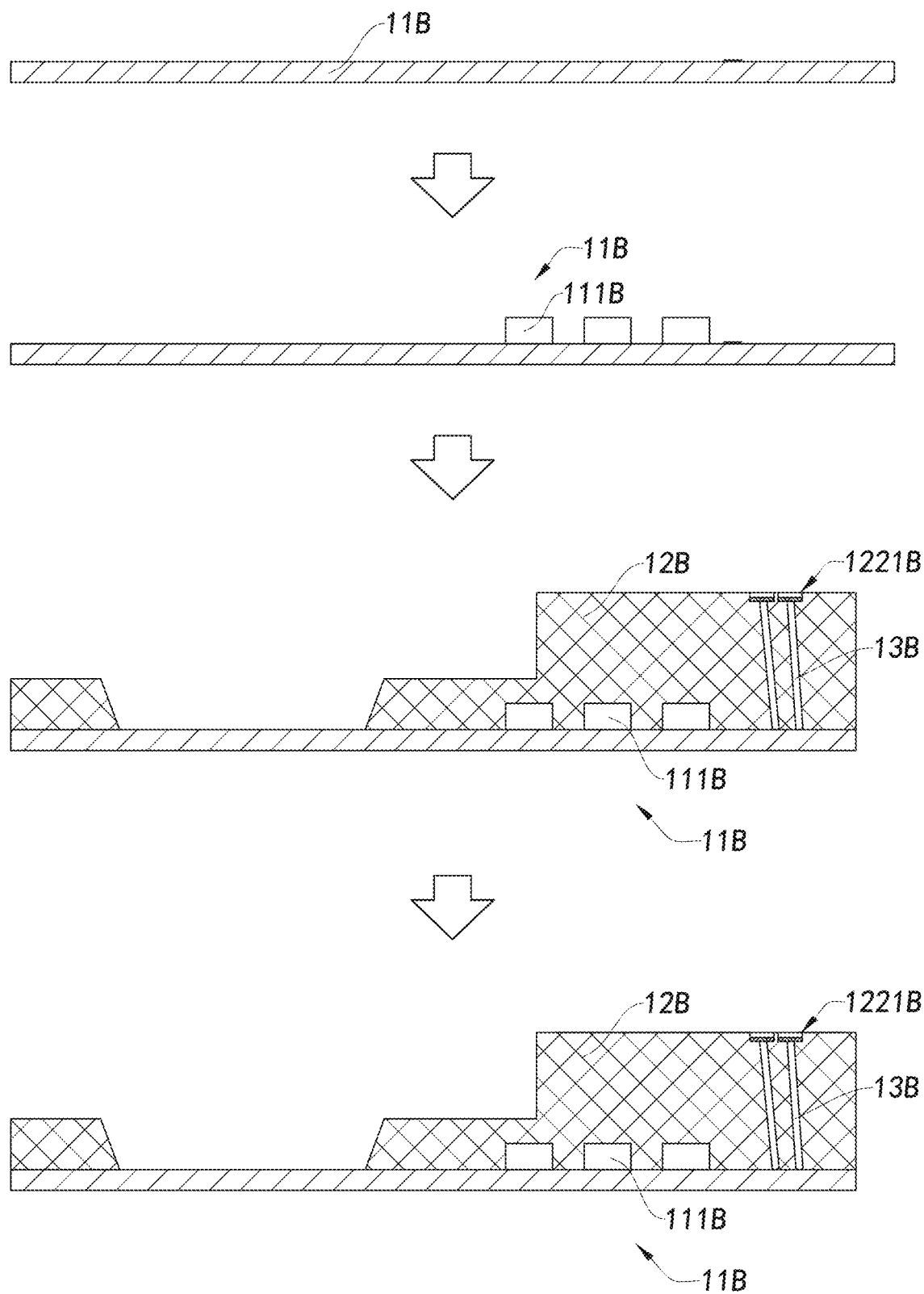
FIGS. 21-23 are schematic diagrams showing a manufacturing process of the TOF depth information camera module according to FIG. 11.
Figure 22:
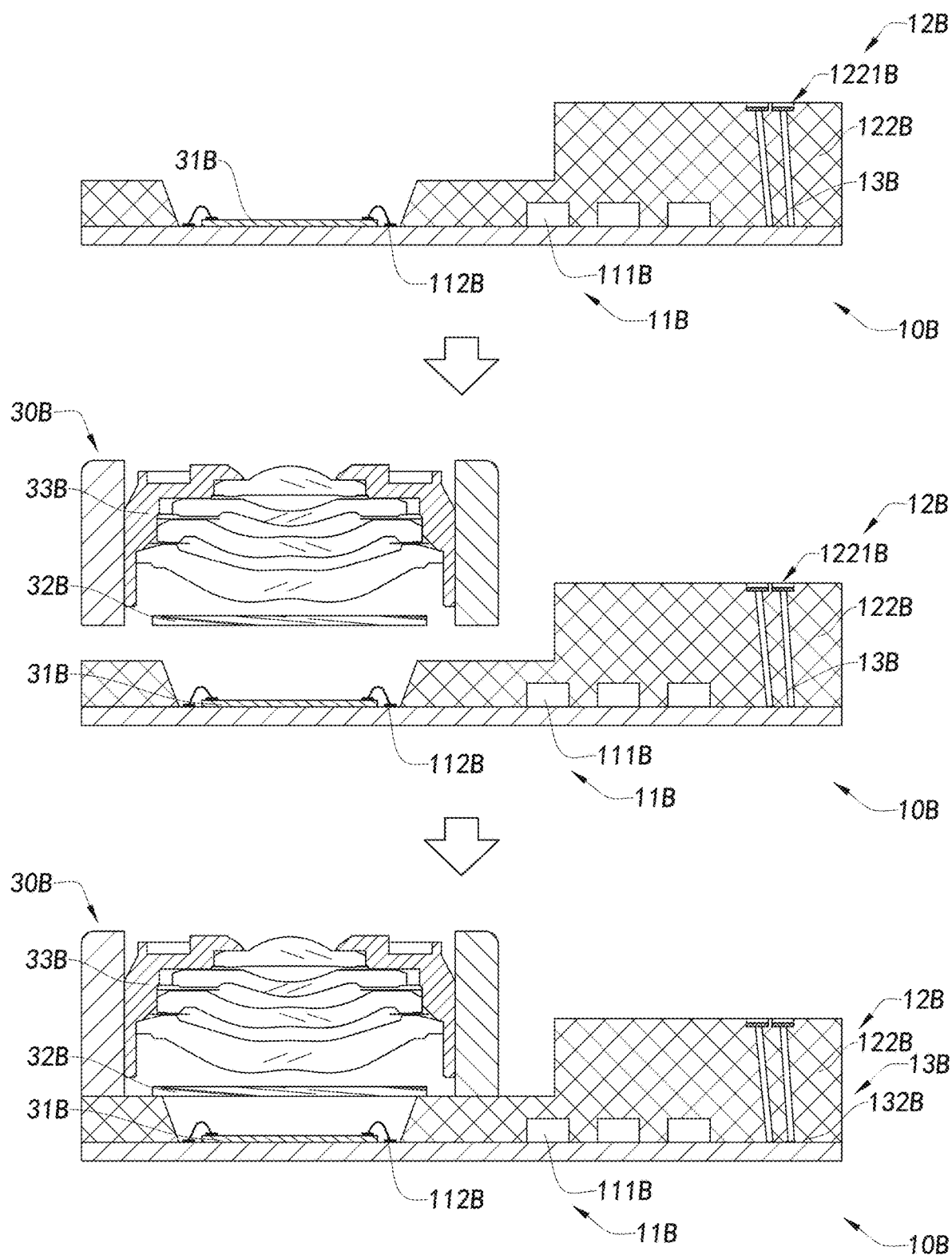
Figure 23:
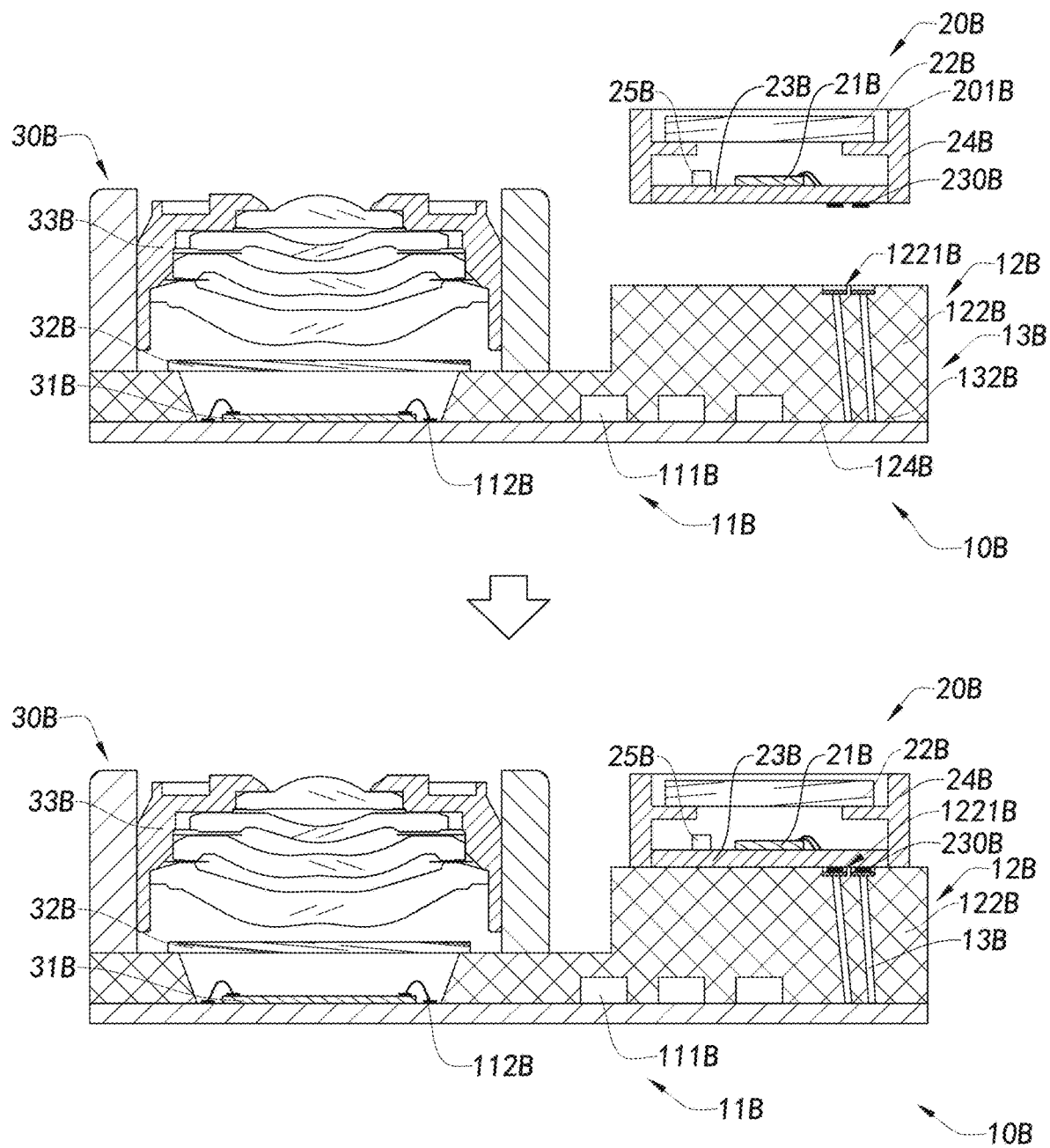

Further, FIGS. 21 to 23 illustrate an exemplary manufacturing process based on the depth information camera module as shown in FIG. 11. As shown in FIG. 21, in the process of manufacturing the TOF depth information camera module, first, the base body 12B is formed on the circuit board 11B by a molding process, where the base body 12B has a carrying portion 122B, and the carrying portion 122B is located on the top side 123B of the base body 12B for mounting the projection assembly 20B thereon. The base body 12B has an opening 121B, and the opening 121B corresponds to the photosensitive element 31B of the receiving assembly 30B. Specifically, in the process of performing a molding process to form the base body 12B, the conductive element 13B is preset in a molding die such that the conductive element 13B is integrally molded with the base body 12B. Correspondingly, the conductive element 13B has a first electrical connection terminal 131B and a second electrical connection terminal 132B, where the first electrical connection terminal 131B of the conductive element 13B is exposed to the carrying portion 122B of the base body 12B, and the second electrical connection terminal 132B of the conductive element 13B is electrically connected to the connection pad of the circuit board 11B.

Further, as shown in FIG. 22, the optical filtering element 32B and the optical lens assembly 33B of the receiving assembly 30B are sequentially mounted in the mounting path of the photosensitive element 31B. For example, the optical filtering element 32B is supported in the optical lens assembly 33B, and the optical lens assembly 33B may be mounted to the base body 12B by threaded connection.

Further, as shown in FIG. 23, the projection assembly 20B is mounted on the carrying portion 122B of the base body 12B such that the projection assembly 20B is supported by the top side 123B of the base body 12B and electrically connected to the circuit board 11B. In particular, in the present disclosure, the projection assembly 20B is an integral projection assembly that has an integral modular structure and is configured by back conduction. Here, "back conduction" refers to that electrical connection terminals of the components (including the projection unit 21B, the detecting element 25B, etc.,) mounted on the front side of the projection assembly circuit board 23B are disposed on the back side of the projection assembly circuit board 23B. Correspondingly, when the projection assembly 20B is mounted on the carrying portion 122B of the base body 12B, the conductive terminals 230B located on the back side of the projection assembly circuit board 23B are overlapped with the carrying portion 122B of the base body 12B, such that the conductive terminals 230B located on the back side of the projection assembly circuit board 23B are respectively correspondingly and electrically connected to the first electrical connection terminals 131B of the conductive elements 13B. In this way, the projection assembly 20B is electrically connected to the circuit board 11B.

In a specific implementation, a conductive medium (for example, a conductive silver adhesive) is applied between the conductive terminal 230B of the projection assembly circuit board 23B and the first electrical connection terminal 131B of the conductive element 13B, so that a stable electrical connection is established between the projection assembly 20B and the conductive element 13B. However, generally, the conductive medium has fluidity, and inevitably, during the application of the conductive medium, the overflow of the conductive medium causes a fault such as short circuit of the projection assembly 20B.

Accordingly, for the above technical problem, in the embodiment of the present disclosure, the base body 12B is further provided with at least one anti-overflow groove 1221B, where the at least one anti-overflow groove 1221B is concavely formed on the carrying portion 122B of the base body 12B, where the first electrical connection terminal 131B of the conductive element 13B is exposed to the at least one anti-overflow groove 1221B. Correspondingly, when the projection assembly 20B is mounted on the carrying portion 122B of the base body 12B, the conductive terminals 230B of the projection assembly 20B are respectively corresponding to and embedded in the at least one anti-overflow groove 1221B to be in contact with the first electrical connection terminals 131B of the conductive elements 13B. For example, the at least one anti-overflow groove 1221B is provided with a conductive silver adhesive. When the projection assembly 20B is mounted on the carrying portion 122B of the base body 12B, the at least one anti-overflow groove 1221B is sealed by the projection assembly circuit board 23B to prevent the conductive silver adhesive from overflowing to cause a short circuit or the like.

In summary, the manufacturing process of the TOF depth information camera module according to the above preferred embodiment of the present disclosure is illustrated. The manufacturing process includes the following steps.

S100, providing a base assembly 10B. The base assembly 10B includes a circuit board 11B, a base body 12B and a conductive element 13B. The base body 12B is supported on the circuit board 11B, the base body 12B has a carrying portion 122B, the carrying portion 122B is located on a top side 123B of the base body 12B, the base body 12B further has an opening 121B, and the opening 121B corresponds to a photosensitive element 31B mounted on the circuit board 11B. The conductive element 13B is embedded in the base body 12B and has a first electrical connection terminal 131B and a second electrical connection terminal 132B. The first electrical connection terminal 131B of the conductive element 13B is exposed to the carrying portion 122B of the base body 12B, and the second electrical connection terminal 132B of the conductive element 13B is electrically connected to the connection pad of the circuit board 11B.

S120, mounting the optical filtering element 32B and the optical lens assembly 33B of the receiving assembly 30B in a photosensitive path of the photosensitive element 31B.

S130, mounting a projection assembly 20B having a modular structure on the carrying portion 122B of the base body 12B.

S140, electrically connecting the projection assembly 20B to the circuit board 11B.

In this embodiment of the present disclosure, before the step S100, the method further includes: mounting and electrically connecting the photosensitive element 31B of the receiving assembly 30B to the circuit board 11B.

In this embodiment of the present disclosure, the step S140 further includes: aligning conductive terminals 230B located on a back side of the projection assembly circuit board 23B with at least one anti-overflow groove 1221B disposed on the carrying portion 122B of the base body 12B respectively; applying a conducting medium to the at least one anti-overflow groove 1221B; and electrically connecting the conductive terminals 230B to the first electrical connection terminal 131B of the conductive element 13B, where the conducting medium is sealed in the at least one anti-overflow groove 1221B.

Figure 24:
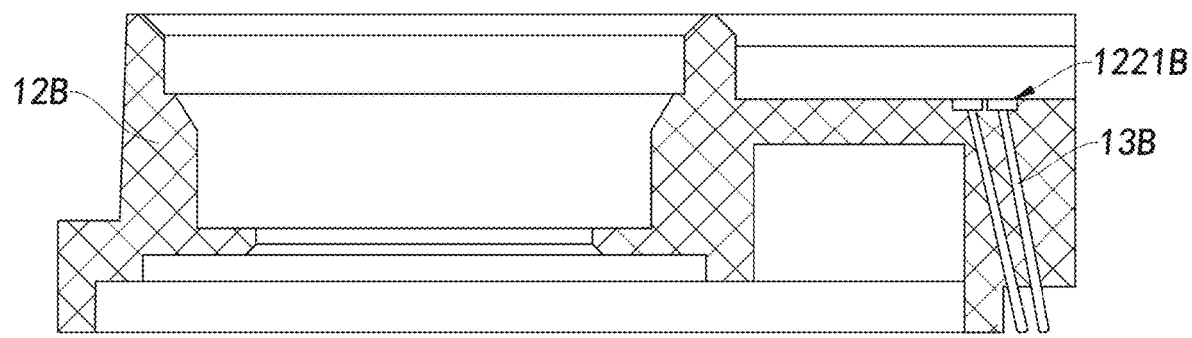
FIGS. 24-26 are schematic diagrams showing a manufacturing process of the TOF depth information camera module according to FIG. 16.
Figure 25:
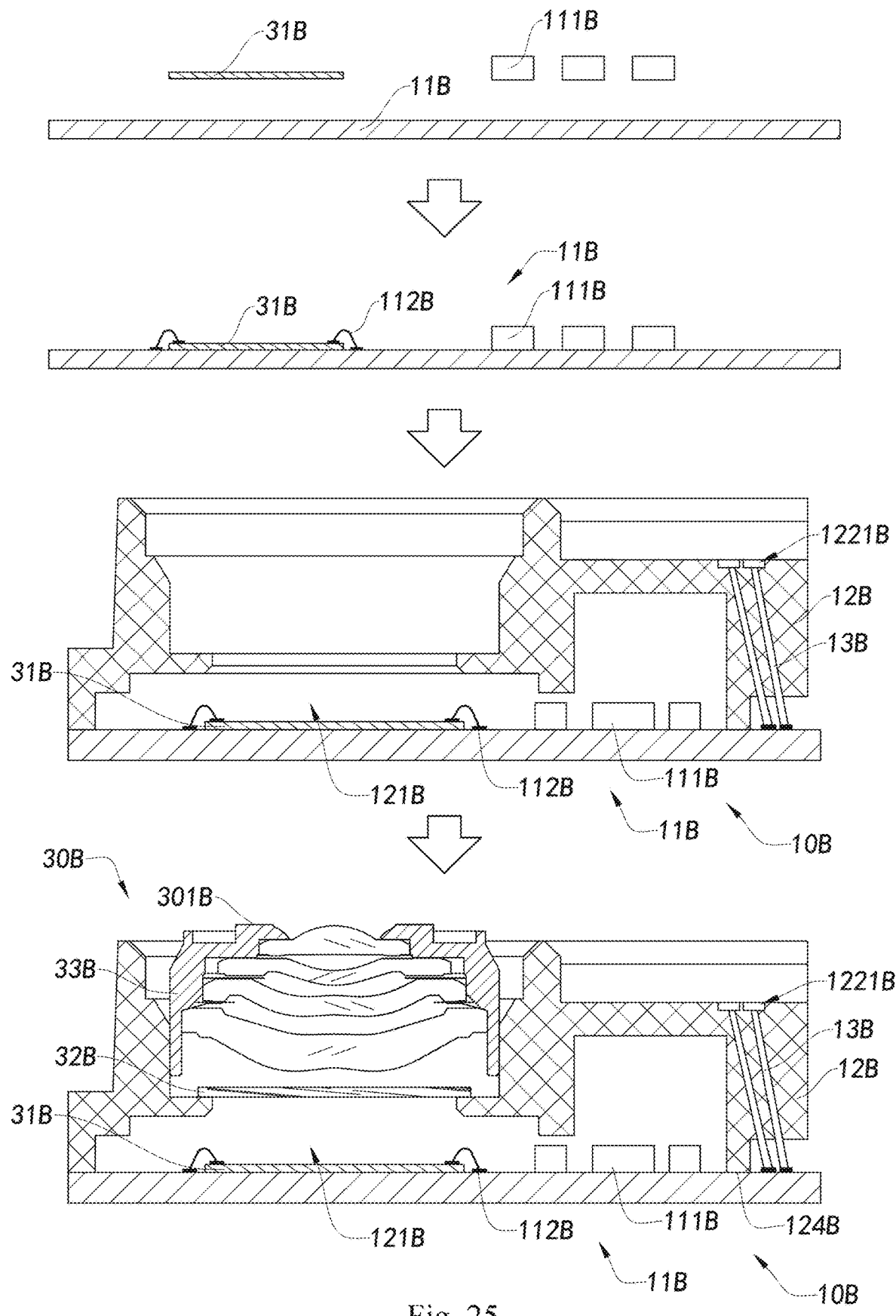
Figure 26:
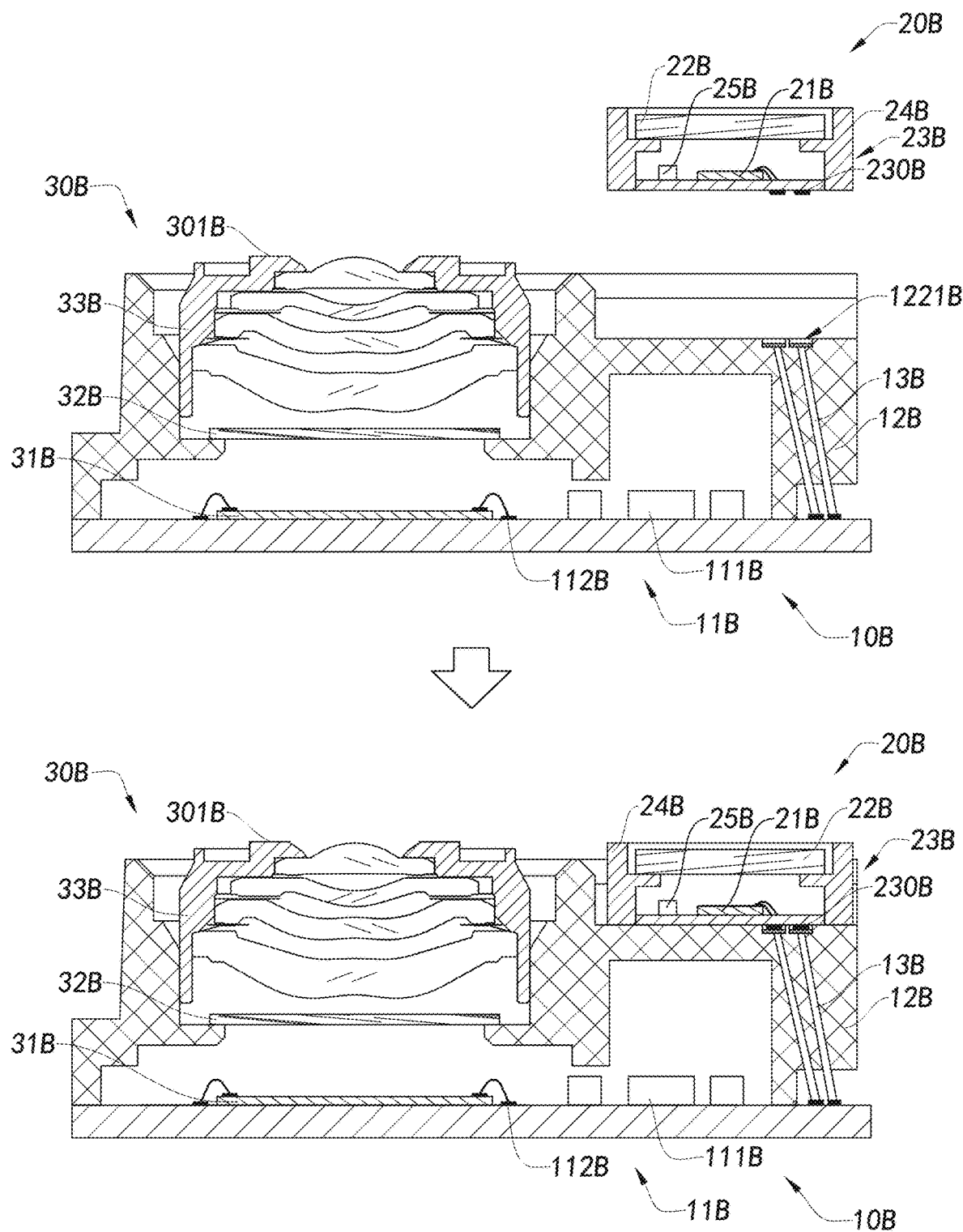

Further, FIGS. 24 to 26 illustrate an exemplary manufacturing process of the TOF depth information camera module based on FIG. 16. As shown in FIG. 24, in the process of manufacturing the TOF depth information camera module, first, a base body 12B is separately molded by an injection molding process. The base body 12B has a carrying portion 122B for mounting the projection assembly 20B thereon, and the conductive element 13B is embedded in the base body 12B for establishing a connection circuit between the projection assembly 20B mounted on the base body 12B and the circuit board 11B.

Here, the base body 12B is separately molded by an injection molding process. Accordingly, in performing the injection molding process to form the base body 12B, the conductive element 13B may be preset at a corresponding position of the injection molding die, such that after the base body 12B is molded, the conductive element 13B is pre-embedded at a corresponding position of the base body 12B. More specifically, the conductive element 13B extends longitudinally in the base body 12B, and has a first electrical connection terminal 131B and a second electrical connection terminal 132B, where the first electrical connection terminal 131B is exposed on the top side 123B of the base body 12B, more specifically, exposed to the carrying portion 122B on the top side 123B of the base body, and is electrically connected to the projection assembly 20B. The second electrical connection terminal 132B is exposed on the bottom side 124B of the base body 12B, and is electrically connected to the circuit board 11B.

Further, as shown in FIG. 25, the photosensitive element 31B of the receiving assembly 30B is mounted and electrically connected to the circuit board 11B of the base assembly 10B. For example, the photosensitive element 31B is mounted to the circuit board 11B by a COB (Chip On Board) method, and is conducted by a gold wire. At the same time, at least one electronic component 111B is mounted (e.g., by Surface Mounting Technique) to the circuit board 11B. In some embodiments of the present disclosure, the at least one electronic component 111B includes part of the electronic components of the projection assembly 20B.

Further, as shown in FIG. 25, the base body 12B is mounted on the circuit board 11B. Here, the base body 12B has a space structure to define and form the receiving cavity 127B, so that when the base body 12B is mounted on the circuit board 11B, the at least one electronic component 111B disposed on the circuit board 11B is housed in the receiving cavity 127B. Meanwhile, the base body 12B has an opening 121B. When the base body 12B is mounted on the circuit board 11B, the opening 121B corresponds to the photosensitive path of the photosensitive element 31B to allow imaging light reach the photosensitive element 31B by the opening 121B to be photosensitive reacted.

In addition, when the base body 12B is mounted on the circuit board 11B, the bottom side 124B of the base body 12B is in contact with the circuit board 11B, so that the second electrical connection terminal 132B exposed on the bottom side 124B of the base body 12B corresponds to the connection pad of the circuit board 11B, so that the second electrical connection terminal 132B of the conductive element 13B may be electrically connected to the circuit board 11B by welding or applying a conductive medium. In particular, the base body 12B has a recessed portion 125B after molding, and the recessed portion 125B is concavely formed on the bottom side 124B of the base body 12B, where the second electrical connection terminal 132B of the conductive element 13B is exposed and partially protruded from the recessed portion 125B. Therefore, when the base body 12B is mounted on the circuit board 11B, the bottom side 124B of the base body 12B is partially overlapped with the circuit board 11B, and at the same time, the second electrical connection terminal 132B of the conductive element 13B partially protruding from the recessed portion 125B corresponds to the connection pad of the circuit board 11B. It should be appreciated that the recessed portion 125B is not overlapped with the circuit board 11B to define an electrical connection space 126B between the circuit board 11B and the recessed portion 125B to facilitate the welding process or the application of the conductive medium by an operator or a welding machine.

Preferably, in the embodiment of the present disclosure, the recessed portion 125B corresponds to an edge area of the circuit board 11B. That is, when the base body 12B is mounted on the circuit board 11B, the electrical connection space 126B defined by the recessed portion 125B and the circuit board 11B is located at the edge area of the circuit board 11B, so that an operator or a welding machine may easily find an operable orientation to perform a welding process or apply a conductive medium.

Further, as shown in FIG. 25, the optical filtering element 32B and the optical lens assembly 33B of the receiving assembly 30B are sequentially mounted in the mounting path of the photosensitive element 31B. For example, the optical filtering element 32B is supported in the optical lens assembly 33B, and the optical lens assembly 33B may be mounted to the base body 12B by threaded connection.

Further, as shown in FIG. 26, the projection assembly 20B is mounted to the carrying portion 122B of the base body 12B such that the projection assembly 20B is supported by the top side 123B of the base body 12B and electrically connected to the circuit board 11B. In particular, in the present disclosure, the projection assembly 20B is an integral projection assembly that has an integral modular structure and is configured by back conduction. Here, "back conduction" refers to that electrical connection terminals of the components (including the projection unit 21B, the detecting element 25B, etc.,) mounted on the front side of the projection assembly circuit board 23B are disposed on the back side of the projection assembly circuit board 23B. Correspondingly, when the projection assembly 20B is mounted on the carrying portion 122B of the base body 12B, the conductive terminals 230B located on the back side of the projection assembly circuit board 23B are overlapped with the carrying portion 122B of the base body 12B, such that the conductive terminals 230B located on the back side of the projection assembly circuit board 23B are respectively correspondingly and electrically connected to the first electrical connection terminals 131B of the conductive elements 13B. In this way, the projection assembly 20B is electrically connected to the circuit board 11B.

In a specific implementation, a conductive medium (for example, a conductive silver adhesive) is applied between the conductive terminal 230B of the projection assembly circuit board 23B and the first electrical connection terminal 131B of the conductive element 13B, so that a stable electrical connection is established between the projection assembly 20B and the conductive element 13B. However, generally, the conductive medium has fluidity, and inevitably, during the application of the conductive medium, the overflow of the conductive medium causes a fault such as short circuit of the projection assembly 20B.

Accordingly, for the above technical problem, in the embodiment of the present disclosure, the base body 12B is further provided with at least one anti-overflow groove 1221B. The at least one anti-overflow groove 1221B is concavely formed on the carrying portion 122B of the base body 12B. The first electrical connection terminal 131B of the conductive element 13B is exposed to the at least one anti-overflow groove 1221B. Correspondingly, when the projection assembly 20B is mounted on the carrying portion 122B of the base body 12B, the conductive terminals 230B of the projection assembly 20B are respectively corresponding to and embedded in the at least one anti-overflow groove 1221B to be in contact with the first electrical connection terminals 131B of the conductive elements 13B. For example, the at least one anti-overflow groove 1221B is provided with a conductive silver adhesive, when the projection assembly 20B is mounted on the carrying portion 122B of the base body 12B, the at least one anti-overflow groove 1221B is sealed by the projection assembly circuit board 23B to prevent the conductive adhesive from overflowing to cause a short circuit or the like.

In summary, the manufacturing process of the TOF depth information camera module according to the above preferred embodiment of the present disclosure is illustrated. The manufacturing process includes the following steps.

S100A, providing a base assembly 10B. The base assembly 10B includes a base body 12B, a conductive element 13B and a circuit board 11B. The base body 12B is supported by the circuit board 11B, the conductive element 13B is embedded in the base body 12B and exposes a first electrical connection terminal 131B and a second electrical connection terminal 132B of the conductive element 13B to a top side 123B and a bottom side 124B of the base body 12B respectively. The base body 12B has a receiving cavity 127B, the receiving cavity 127B is formed in the base body 12B. The base body 12B has a carrying portion 122B, the carrying portion 122B is formed on the top side 123B of the base body 12B, and the base body 12B also has an opening 121B.

S110A, mounting and electrically connecting the photosensitive element 31B of the receiving assembly 30B to the circuit board 11B of the base assembly 10B.

S120A, mounting the base body 12B on the circuit board 11B, such that at least one electronic component 111B disposed on the circuit board 11B is housed in the receiving cavity 127B, and the opening 121B of the base body 12B corresponds to the photosensitive path of the photosensitive element 31B, such that the second electrical connection terminal 132B of the conductive element exposed to the bottom side 124B of the base body 12B corresponds to the connection pad of the circuit board 11B.

S130A, sequentially mounting the optical filtering element 32B and the optical lens assembly 33B of the receiving assembly 30B in the photosensitive path of the photosensitive element 31B.

S140A, mounting a projection assembly 20B having a modular structure on the carrying portion 122B of the base body 12B.

S150A, electrically connecting the projection assembly 20B to the circuit board 11B.

In this embodiment of the present disclosure, the step S100A includes: forming the base body 12B and the conductive element 13B by an injection molding process. The conductive element 13B is embedded in the base body 12B, and a first electrical connection terminal 131B and a second electrical connection terminal 132B of the conductive element 13B are exposed respectively on the top side 123B and the bottom side 124B of the base body 12B.

In this embodiment of the present disclosure, the step of forming the base body 12B and the conductive element 13B by an injection molding process, includes: presetting the conductive element 13B in a molding die of the base body 12B; and forming the base body 12B by performing an injection molding process such that the conductive element 13B is embedded in the base body 12B.

In this embodiment of the present disclosure, the step S150A further includes: aligning the conductive terminals 230B located on a back side of the projection assembly circuit board 23B with at least one anti-overflow groove 1221B disposed on the carrying portion 122B of the base body 12B respectively; applying a conducting medium to the at least one anti-overflow groove 1221B; and electrically connecting the conductive terminals 230B to the first electrical connection terminal 131B of the conductive element 13B, where the conducting medium is sealed in the at least one anti-overflow groove 1221B.

Figure 27:
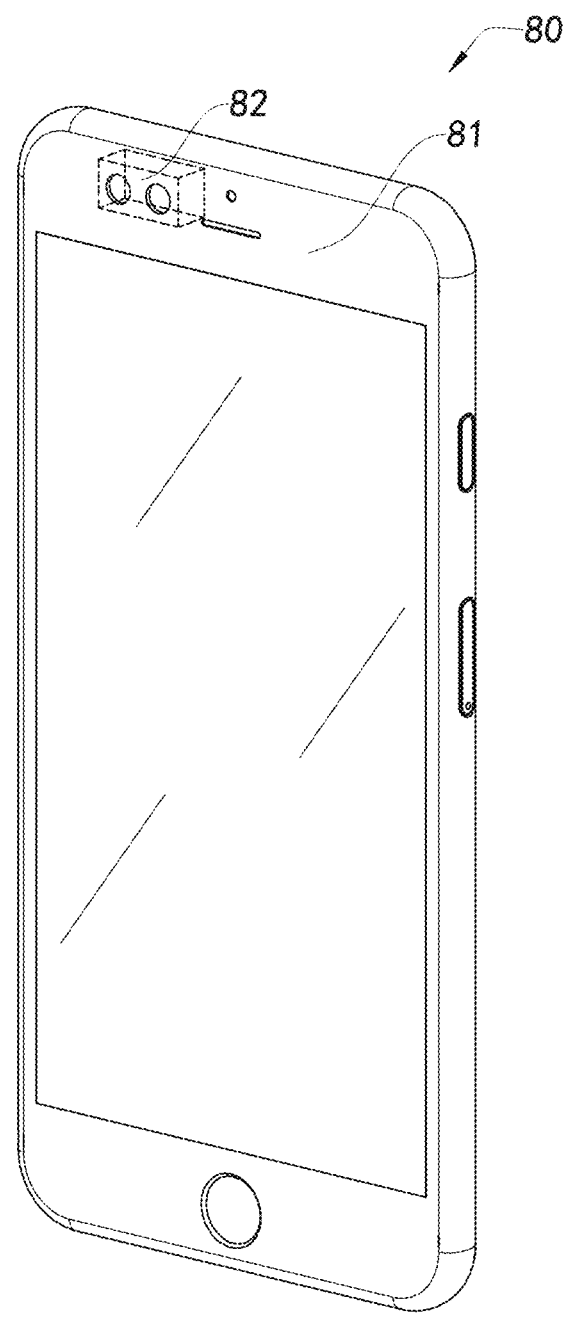
FIG. 27 is a stereoscopic schematic diagram of the TOF depth information camera module assembled to a mobile terminal provided by the present disclosure.

According to another aspect of the present disclosure, as shown in FIG. 27, the present disclosure further provides an electronic device 80 including an electronic device body 81 and a TOF depth information camera module 82 disclosed in the present disclosure. The camera module 82 is assembled to the electronic device body 81 to provide an image depth information image acquisition function for the electronic device 80.

In particular, in a specific implementation of the electronic device 80 provided by the present disclosure, the camera module 82 is assembled on the front side of the electronic device body 81. That is, the camera module is a front camera module of the electronic device 80 to perform corresponding application development, such as face smart unlocking, based on the three-dimensional image information of a to-be-detected face acquired by the TOF depth information camera module.

It can be seen that the purpose of the present disclosure may be fully and effectively accomplished. The embodiments used to explain the function and structural principles of the present disclosure have been fully illustrated and described, and the present disclosure is not limited by the changes based on the principles of these embodiments. Accordingly, the present disclosure includes all modifications that come within the scope and spirit of the appended claims.

What is claimed is:

1. A depth information camera module, comprising:
a projection assembly, the projection assembly comprising a projection assembly circuit board and a projection unit, the projection unit being electrically connected to the projection assembly circuit board to project a laser to a to-be-detected object after being conducted;
a receiving assembly, the receiving assembly comprising a photosensitive element for receiving the laser reflected from the to-be-detected object; and
a base assembly, the base assembly comprising a circuit board and a base body, the base body being supported by the circuit board, the photosensitive element of the receiving assembly being electrically connected to the circuit board, the projection assembly circuit board being supported on a top side of the base body, the base assembly further comprising a conductive element, and the conductive element being disposed between the projection assembly circuit board and the circuit board for conducting the projection assembly to the circuit board.

2. The depth information camera module according to claim 1, wherein a size of the projection assembly circuit board is smaller than a size of the circuit board.

3. The depth information camera module according to claim 2, wherein a projection of the projection assembly circuit board relative to the circuit board is at least partially located within the circuit board.

4. The depth information camera module according to claim 3, wherein the base body is integrally molded on the circuit board.

5. The depth information camera module according to claim 3, wherein the base body is a separate component relative to the circuit board, and the base body is mounted to the circuit board.

6. The depth information camera module according to claim 4, wherein the conductive element is integrally molded with the base body and embedded in the base body, the conductive element has a first electrical connection terminal and a second electrical connection terminal, the first electrical connection terminal is exposed on the top side of the base body for electrically connecting the projection assembly, and the second electrical connection terminal is electrically connected to the circuit board.

7. The depth information camera module according to claim 4, wherein the conductive element is implemented as a flexible board, the flexible board extends integrally and folded between the projection assembly circuit board and the circuit board for conducting the circuit board and the projection assembly.

8. The depth information camera module according to claim 6, wherein the projection assembly has an integral structure, the projection assembly circuit board has a front side and a back side opposite to the front side, the projection unit is mounted and electrically connected to the front side of the projection assembly circuit board, the projection assembly circuit board has a set of conductive terminals, the conductive terminals are located on the back side of the projection assembly circuit board, and when the projection assembly is mounted on the top side of the base body, the conductive terminals of the projection assembly are electrically connected to the first electrical connection terminals of the conductive elements respectively, to electrically connect the projection assembly to the circuit board.

9. The depth information camera module according to claim 8, wherein the base body further has at least one anti-overflow groove, the at least one anti-overflow groove is formed concavely on the top side of the base body, the first electrical connection terminals of the conductive elements are respectively exposed to the at least one anti-overflow groove, and when the projection assembly is mounted on the top side of the base body, the conductive terminals of the projection assembly respectively correspond to the at least one anti-overflow groove, and are respectively electrically connected to the first electrical connection terminals of the conductive elements exposed in the at least one anti-overflow groove.

10. The depth information camera module according to claim 1, further comprising at least one electronic component, wherein the at least one electronic component is mounted and electrically connected to the circuit board, and a portion of the at least one electronic component is located below the projection assembly circuit board.

11. The depth information camera module according to claim 10, wherein the at least one electronic component comprises part of electronic components of the projection assembly.

12. The depth information camera module according to claim 10, wherein the projection assembly circuit board is a ceramic substrate.

13. The depth information camera module according to claim 12, wherein the base body further has a heat conductive through-hole penetrating through the base body to expose the projection assembly circuit board by the heat conductive through-hole.

14. A manufacturing method for a depth information camera module, comprising:
   providing a base assembly, wherein the base assembly comprises a circuit board and a base body, the base body is supported on the circuit board, the base body has a carrying portion, the carrying portion is located on a top side of the base body, the base body further has an opening, and the opening corresponds to a photosensitive element mounted to the circuit board;
   mounting an optical filtering element and an optical lens assembly to a photosensitive path of the photosensitive element;
   mounting a projection assembly having a modular structure to the carrying portion of the base body; and
   electrically connecting the projection assembly to the circuit board.

15. The manufacturing method for a depth information camera module according to claim 14, wherein the base assembly further comprises a conductive element, the conductive element is integrally molded with the base body and embedded in the base body, the conductive element has a first electrical connection terminal and a second electrical connection terminal, the first electrical connection terminal is exposed on the top side of the base body for electrically connecting the projection assembly, and the second electrical connection terminal is electrically connected to the circuit board.

16. The manufacturing method for a depth information camera module according to claim 15, wherein the electrically connecting the projection assembly to the circuit board comprises:
   aligning conductive terminals located on a back side of a projection assembly circuit board of the projection assembly with at least one anti-overflow groove disposed on the carrying portion of the base body respectively;
   applying a conducting medium to the at least one anti-overflow groove; and
   electrically connecting the conductive terminals to the first electrical connection terminals of the conductive elements, the conducting medium is sealed in the at least one anti-overflow groove.

17. The manufacturing method for a depth information camera module according to claim 14, wherein the base assembly further comprises a conductive element, the conductive element is implemented as a flexible board, and the flexible board extends integrally and folded between the projection assembly circuit board and the circuit board for conducting the circuit board and the projection assembly.

18. The manufacturing method for a depth information camera module according to claim 17, wherein the electrically connecting the projection assembly to the circuit board comprises:
   folding the flexible board such that the projection assembly is overlapped with the carrying portion of the base body.

19. An electronic device, comprising:
   an electronic device body; and
   a depth information camera module according to claim 1, wherein the depth information camera module is assembled to the electronic device body for acquiring depth image information.

* * * * *